US011863661B2

(12) United States Patent
Troia et al.

(10) Patent No.: US 11,863,661 B2
(45) Date of Patent: Jan. 2, 2024

(54) SECURE MONITORING USING BLOCK CHAIN

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/373,306

(22) Filed: Jul. 12, 2021

(65) Prior Publication Data

US 2021/0344481 A1 Nov. 4, 2021

Related U.S. Application Data

(63) Continuation of application No. 16/363,323, filed on Mar. 25, 2019, now Pat. No. 11,063,747.

(51) Int. Cl.
*H04L 9/00* (2022.01)
*H04L 9/06* (2006.01)
(Continued)

(52) U.S. Cl.
CPC .............. *H04L 9/0643* (2013.01); *G07C 9/22* (2020.01); *H04L 9/3247* (2013.01);
(Continued)

(58) Field of Classification Search
CPC ... H04L 9/0643; H04L 9/3239; H04L 9/3247; H04L 9/50; H04L 63/00; H04L 63/0876;
(Continued)

(56) References Cited

U.S. PATENT DOCUMENTS 5,475,378 A 12/1995 Kaarsoo
6,986,052 B1 1/2006 Mittal
(Continued)

FOREIGN PATENT DOCUMENTS

JP 2018-085906 A 5/2018
JP 2019-028549 A 2/2019
(Continued)

OTHER PUBLICATIONS

U.S. Appl. No. 15/853,498, entitled, "Physical Unclonable Function Using Message Authentication Code", filed Dec. 22, 2017, 28 pages.
(Continued)

*Primary Examiner* — Eric W Shepperd
(74) *Attorney, Agent, or Firm* — Brooks, Cameron & Huebsch, PLLC

(57) ABSTRACT

The present disclosure includes apparatuses, methods, and systems for using a local ledger block chain for secure updates. An embodiment includes a memory, and circuitry configured to receive a global block to be added to a local ledger block chain for validating an update for data stored in the memory, where the global block to be added to the local ledger block chain includes a cryptographic hash of a current local block in the local ledger block chain, a cryptographic hash of the data stored in the memory to be updated, where the current local block in the local ledger block chain has a digital signature associated therewith that indicates the global block is from an authorized entity.

19 Claims, 15 Drawing Sheets

(51) Int. Cl.
  *H04L 9/32* (2006.01)
  *H04L 9/40* (2022.01)
  *G07C 9/22* (2020.01)
(52) U.S. Cl.
  CPC ............ *H04L 63/0876* (2013.01); *H04L 9/50* (2022.05); *H04L 2209/24* (2013.01)
(58) Field of Classification Search
  CPC ............. H04L 2209/24; H04L 2209/38; H04L 2209/84; G07C 9/22
  See application file for complete search history.

(56) References Cited

U.S. PATENT DOCUMENTS

| | | | |
|---|---|---|---|
| 8,009,013 | B1 | 8/2011 | Hirschfeld |
| 10,169,937 | B1 | 1/2019 | Zwink et al. |
| 10,534,913 | B2 | 1/2020 | Daniel |
| 10,600,009 | B1 | 3/2020 | Augustine |
| 10,745,943 | B1 | 8/2020 | Jonak |
| 2010/0042824 | A1 | 2/2010 | Lee |
| 2010/0057960 | A1 | 3/2010 | Renno |
| 2015/0288694 | A1* | 10/2015 | Liebl, III ............. H04L 9/3247 713/182 |
| 2016/0283920 | A1 | 9/2016 | Fisher |
| 2017/0046652 | A1* | 2/2017 | Haldenby ............. G06F 21/645 |
| 2017/0295180 | A1* | 10/2017 | Day ........................ H04L 63/10 |
| 2017/0295232 | A1 | 10/2017 | Curtis |
| 2018/0129700 | A1* | 5/2018 | Naccache ........... G06F 16/9024 |
| 2018/0158036 | A1 | 6/2018 | Zhou |
| 2018/0268617 | A1 | 9/2018 | Bruce |
| 2018/0272886 | A1 | 9/2018 | Stocker et al. |
| 2018/0342036 | A1* | 11/2018 | Zachary .................. H04W 4/44 |
| 2019/0028264 | A1 | 1/2019 | Bisti |
| 2019/0058709 | A1 | 2/2019 | Kempf et al. |
| 2019/0130483 | A1 | 5/2019 | de Jong |
| 2019/0156363 | A1 | 5/2019 | Postrel |
| 2019/0268162 | A1* | 8/2019 | Sahagun ............. H04L 9/3236 |
| 2019/0332586 | A1 | 10/2019 | Wang |
| 2019/0391268 | A1* | 12/2019 | Houts ................ G01C 21/3837 |
| 2019/0392118 | A1* | 12/2019 | Elden ...................... G06F 21/64 |
| 2019/0394046 | A1* | 12/2019 | Su ........................... G06F 8/654 |
| 2020/0092704 | A1 | 3/2020 | Singh |
| 2020/0118068 | A1 | 4/2020 | Turetsky |
| 2020/0118207 | A1 | 4/2020 | Jovanovic |
| 2020/0145191 | A1* | 5/2020 | Qi ......................... H04L 9/3247 |
| 2020/0184706 | A1 | 6/2020 | Speasl |
| 2020/0204352 | A1* | 6/2020 | Thompson ............ H04L 9/3247 |
| 2020/0219045 | A1 | 7/2020 | Kikinis |
| 2020/0228342 | A1 | 7/2020 | Nixon |
| 2020/0244472 | A1 | 7/2020 | Dinkelaker |
| 2021/0258150 | A1 | 8/2021 | Moeller |
| 2022/0076246 | A1* | 3/2022 | Griffin ............... G06Q 20/3678 |

FOREIGN PATENT DOCUMENTS

| | | |
|---|---|---|
| KR | 10-2019-0001546 A | 1/2019 |
| WO | 2017-203093 A1 | 11/2017 |

OTHER PUBLICATIONS

U.S. Appl. No. 16/201,652, entitled, "Parking Infrastructure Powered by a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.
International Search Report and Written Opinion from related International Application No. PCT/US2020/024379, dated Jul. 17, 2020, 15 pages.
Sean Rowan, et al., "Securing Vehicle to Vehicle Communications using Blockchain through Visible Light and Acoustic Side-Channels", Cryptography and Security, Cornell University, Apr. 9, 2017, retrieved from the Internet: https://arxiv.org/abs/1704.02553, 10 pages.

* cited by examiner

SECURE MONITORING USING BLOCK CHAIN

PRIORITY INFORMATION

This application is a Continuation of application Ser. No. 16/363,323, filed on Mar. 25, 2019, the contents of which are incorporated herein by reference.

TECHNICAL FIELD

The present disclosure relates generally to semiconductor memory and methods, and more particularly, to using memory for securely monitoring traffic using a block chain.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the data stored in the memory cells of a memory device. Such threats can include, for example, faults occurring in the memory device, and/or threats from hackers or other malicious users. Such threats can cause significant financial loss, and/or can present significant safety and/or security issues.

DETAILED DESCRIPTION

Figure 1:
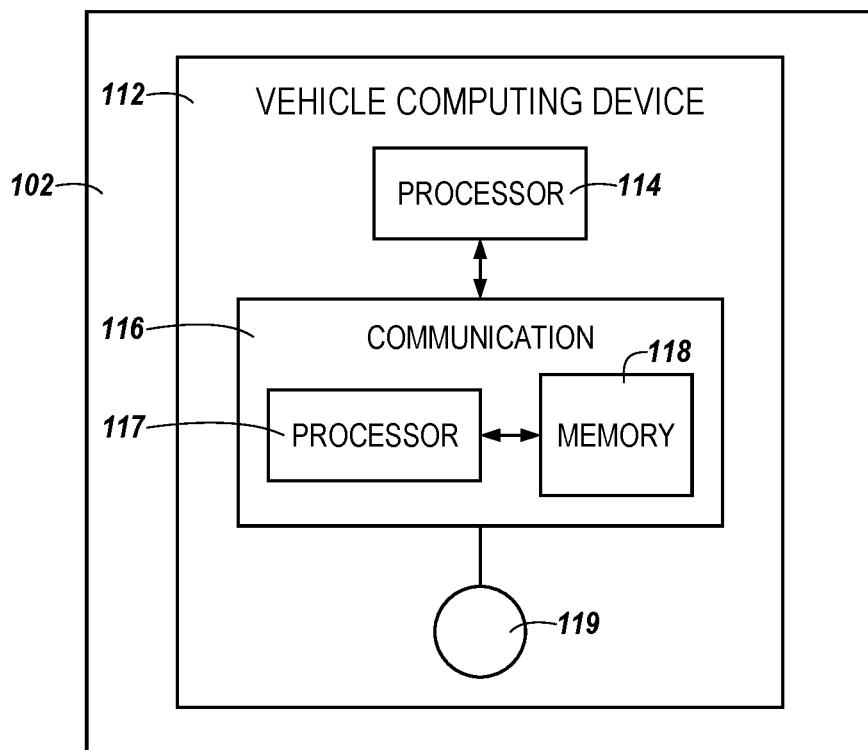
FIG. 1 is a block diagram of an example vehicular entity, in accordance with an embodiment of the present disclosure.

The present disclosure includes apparatuses, methods, and systems for secure traffic monitoring. An example apparatus for secure traffic monitoring can include a memory and circuitry. The circuitry can be configured to receive identity data, a signature, and a request to enter a location from an entity. The circuitry can be configured to analyze the request by verifying an identity of the entity based on the identity data and the signature. The circuitry can be configured to analyze the request further by consulting at least one of a plurality of blocks in a block chain to determine whether data associated with the entity authenticates entry into the location. Each of the plurality of blocks in the block chain can include a cryptographic hash of a previous block in the block chain and a cryptographic hash of each of the respective plurality of blocks. The circuitry can be configured to, in response to verifying the identity of the entity and authenticating entry into the location, generate a block in the plurality of blocks in the block chain.

Each block of the block chain may be associated with an individual host or multiple hosts. As described herein, memory and circuitry may be configured to receive multiple blocks from a global ledger block chain to generate a local ledger block chain, where the local ledger block chain includes only blocks related to a host and/or memory associated with the circuitry, where each related host and/or memory is associated with a particular entrance point, a particular gate, etc.

Many threats can affect the data stored in a memory (e.g., in a memory device). For example, faults may occur in the array and/or circuitry of the memory, which can result in errors occurring in the data and unauthorized access to a particular location. As an additional example, a hacker or other malicious user may attempt to perform activities to make unauthorized changes to the data for malicious purposes. Such activities performed by a hacker may include providing a fraudulent identity, fraudulent requests to access a restricted area, etc. Such hacking activities (e.g., attacks) can allow access to a restricted area or location that a vehicular entity does not have authorization to access and can present significant safety and/or security issues.

As such, in order to ensure a secure memory system and secure access to particular locations and/or areas, it is important to validate (e.g., authenticate and/or attest) that identity data and/or a request to access a location is genuine (e.g., is the correct, from an authentic/authorized entity, and has not been altered and/or fraudulently provided by hacking activity or other unauthorized and/or unintended changes. Embodiments of the present disclosure can use memory as a block in a block chain data structure (e.g. use the memory as a storage component for the block chain) in order to effectively validate the identity data and/or access request, and thereby ensure a secure memory system. For instance, embodiments of the present disclosure can modify, utilize, and/or differently operate the existing circuitry of the memory (e.g., the existing firmware of the memory device) to use the memory as a block in a block chain, such as using memory associated with a block in a global block chain and/or more particularly organized data of a block in a local ledger block chain that indicates an association with a particular vehicular entity, a particular entrance or gate, etc. without having to add additional (e.g., new) components or circuitry to the memory.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

In some previous approaches, a vehicular entity (e.g., a citizen vehicle, an ambulance, police car, etc.) can communicate with other devices (such as a device of an entrance, a gate, etc.) using more simplified communication methods than will be described below. In the example where a vehicular entity communicates with an entry node, the communication may not be secure. For example, the communication between the vehicular entity and the entry node and/or an additional entry node may be intercepted and/or manipulated by a hacker or other entities in order to change the communication, repeat the communication to gain unauthorized access to the location or area, etc. In such instances, the vehicular entity may not provide an ability to verify its identity to insure to the recipient of the communication that the vehicular entity is authorized to provide such communication (e.g., to access a location, to enter a roadway, etc.). Absent an ability to verify the identity of the vehicular entity and whether the vehicular entity is authorized to access the location, the communication may be unauthorized and may result in unauthorized access to a location.

A vehicular communication component associated with a vehicular entity can provide authorization data, including a signature, identification data, etc., that can verify the vehicular entity's identity and insure that requests made to other vehicles, entry gates, etc., is authorized, resulting in secure communication and authorized access to restricted locations. However, in previous approaches, the communication between the vehicular entity and the entry node can be both public and unsecured, introducing possible nefarious activity that can negatively affect the ability of a vehicular entity that actually has authorized access to the location from entering the location.

As will be described herein, by introducing a secure form of communication for providing requests, verifying an identity, and determining whether access to a location is authorized for a vehicular entity, information related to nefarious activity in relation to the request data can be rejected, avoided, discarded, etc., and/or access to a location denied. Public keys can be exchanged and used to encrypt data while private keys, which remain private and exclusive to a single entity, can be used to decrypt data. In this way, those without the private key are prevented from intercepting access data and using it for purposes other than initially intended. Further, certificates and signatures can be generated using private keys to verify identities of a sender of data and insure that data originates from an intended or claimed source.

FIG. 1 is a block diagram of an example vehicular entity 102, in accordance with an embodiment of the present disclosure. The vehicular entity 102 can be an autonomous vehicle, a traditional non-autonomous vehicle, a service vehicle, or the like. The vehicular entity 102 can include a vehicle computing device 112, such as an on-board computer. As shown, the vehicle computing device 112 can include a processor 114 coupled to a vehicular communication component 116, such as a reader, writer, transceiver, and/or other computing device or circuitry capable of performing the functions described below to exchange information, that is coupled to (e.g., or includes) an antenna 119. The vehicular communication component 116 can include logic and/or circuitry that is used to perform the actions recited below (e.g., encrypt/decrypt, execute instructions, etc.). Vehicular communication component 116 can include a processing resource 117 coupled to a memory 118, such as a non-volatile flash memory, although embodiments are not so limited. The vehicle computing device 112 can be coupled to or within a vehicular entity 102 such as an autonomous vehicle, an ambulance, a police vehicle, a fire truck, etc.

Figure 2:
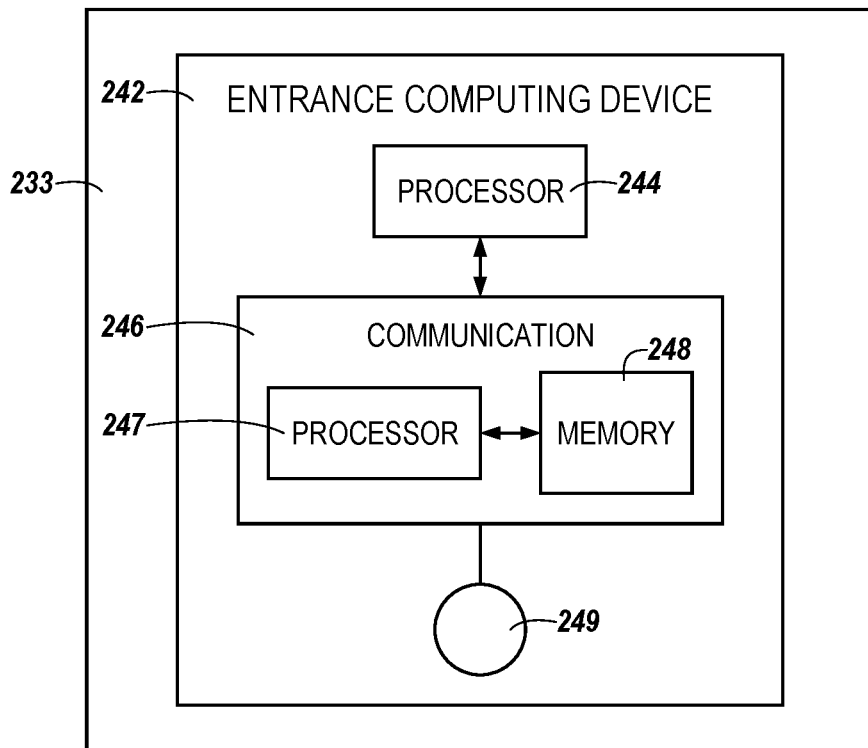
FIG. 2 is a block diagram of an example vehicular entity in accordance with an embodiment of the present disclosure.

Vehicular communication component 116 can receive traffic, road, and/or vehicle data from additional computing devices, such as a entrance entity described in association with FIG. 2, or an additional electronic sign, electronic light, and/or digitized roadway, etc. As an example, a roadway and/or sign can be coupled to, or have embedded within the roadway and/or sign, a communication component (similar to vehicular communication component 116) that can communicate data associated with road/sign conditions, road/sign status, etc.

FIG. 2 is a block diagram of an entrance entity 233. The entrance entity can be an entrance point to a location, a gate, an entrance to a roadway, etc. The entrance entity 233 can include an entrance computing device 242 coupled to, attached to, and/or within close proximity of the entrance entity 233. The entrance computing device 242 can use various communication methods, such as wireless communication, to communicate with the vehicle computing device 112. In the example of FIG. 2, the entrance computing device 242 can include a processor 244 to execute instructions and control functions of the entrance computing device 242. The processor 244 may be coupled to an entrance communication component 246, such as a reader, writer, transceiver, and/or other computing device or circuitry capable of performing the functions described below to exchange information, that is coupled to (e.g., or includes) an antenna 249. Entrance communication component 246 can include a processing resource 247 coupled to a memory 248, such as a non-volatile flash memory, although embodiments are not so limited. The antenna 249 of the entrance computing device 242 can be in communication with, e.g., communicatively coupled to, the antenna 119 of the vehicle computing device 112 shown in FIG. 1.

In some examples, antennas 249 and 119 can be loop antennas configured as inductor coils, etc. Antenna 119 can loop around vehicle computing device 112, for example. Antenna 119 can generate an electromagnetic field in response to current flowing through antenna 119. For example, the strength of the electromagnetic field can depend on the number of coils and the amount of current. The electromagnetic field generated by antenna 119 can induce current flow in an antenna 249 that powers the respective entrance computing device 242. As an example, antenna 119 in FIG. 1 can induce current flow in antenna 249 when the entrance computing device 242 is brought within a communication distance (e.g., a communication range) of the antenna 119. For example, the communication distance can depend on the strength of the electromagnetic field generated by antenna 119. The electromagnetic field generated by antenna 119 can be set, by the number of coils of antenna 119 and/or the current passing through antenna 119, such that the communication distance can span from the location of the vehicle computing device 112 to the entrance computing device 242. In some examples, the communication distance can be about 50 centimeters to about 100 centimeters on either side of the vehicle computing device 112. In the alternative, the communication distance can depend on the strength of the electromagnetic field generated by antenna 249. In this instance, the electromagnetic field generated by antenna 249 can be set by the number of coils of 249 and/or the current passing through antenna 249.

In some examples, the entrance computing device 242 can include a number of wireless communication devices, such as transmitters, transponders, transceivers, or the like. As an example, the entrance communication component 246 can be such a wireless communication device. Wireless communication that can be used can include near field communication (NFC) tags, RFID tags, or the like. In at least one embodiment, wireless communication can be performed using non-volatile storage components that can be respectively integrated into chips, such as microchips. Each of the respective chips can be coupled to a respective antenna, such as antenna 249. The respective storage components can store respective identity data, notification data, vehicle data, road data, and/or sign data.

Vehicular and entrance data can be transmitted from the vehicular communication component 116 of the vehicle computing device 112 to the entrance communication component 246 of the entrance computing device 242 in response to the vehicle computing device 112 passing within the communication distance of the respective entrance computing device 242. The vehicle and/or notification data can be transmitted in the form of signals, such as radio frequency signals. For example, the vehicular communication component 116 of the vehicle computing device 112 and the entrance communication component 246 of the entrance computing device 242 can communicate using radio frequency signals.

For examples in which wireless communication devices are NFC tags, vehicular communication component 116 of the vehicle computing device 112 can be an NFC reader and can communicate with wireless communication devices using an NFC protocol that can be stored in memory 118 for processing by processing resource 117. In one example, the vehicular communication component 116 and wireless communication devices, such as entrance communication component 246, can communicate at about 13.56 mega-Hertz according to the ISO/IEC 18000-3 international standard for passive RFID for air interface communications. For example, the information can be transmitted in the form of a signal having a frequency of about 13.56 mega-Hertz.

In some examples, an entrance computing device 242 can be used to collect identity data, vehicle data, authorization data, and/or request data, such as a status of an approaching vehicle, an identity of an approaching vehicle, a request being made to access a particular location, etc. For example, the current vehicle status (e.g., whether the vehicle has entered the location before, a frequency of entering the location, which sub-area within the location the request is requesting access to), an identity of the vehicle, and/or a date and time can be transmitted from the vehicular communication component 116 to the entrance communication component 246.

In some examples, the vehicle computing device 112 and/or the entrance computing device 242 can use a passive wireless communication device, such as a short-range communication device (e.g., an NFC tag) that can be as described previously. The NFC tag can include a chip having a non-volatile storage component that stores information, such as vehicle information, identity information, vehicular device or apparatus information, and/or information about a location and its restricted access. Further, the NFC tag can include an antenna.

The vehicular communication component 116 can receive information from the NFC tag and/or can transmit information to the NFC tag. In some examples, a communications device can include a reader (e.g., an NFC reader), such as a vehicle device reader.

The memory 118 of the vehicular communication component 116 can include instructions that operate according to an NFC protocol that allows vehicular communication component 116 to communicate with the NFC tag. For example, the vehicular communication component 116 and the NFC tag can communicate using the NFC protocol, such as at about 13.56 mega-Hertz and according to the ISO/IEC 18000-3 international standard.

The vehicular communication component 116 may also communicate with an operations center, such as a hospital, a fire station, a police station, etc. For example, vehicular communication component 116 can be wirelessly coupled or hardwired to the operations center. In some examples, vehicular communication component 116 can communicate with the operations center via WIFI or over the Internet. The vehicular communication component 116 can energize the NFC tag when the antenna 119 associated with the NFC tag is brought within a communication distance of antenna 249, as described previously. The communication distance can be shorter and bring the devices relatively near each other and can provide better security and use less power than previous approaches that use RFID tags.

Figure 3A:
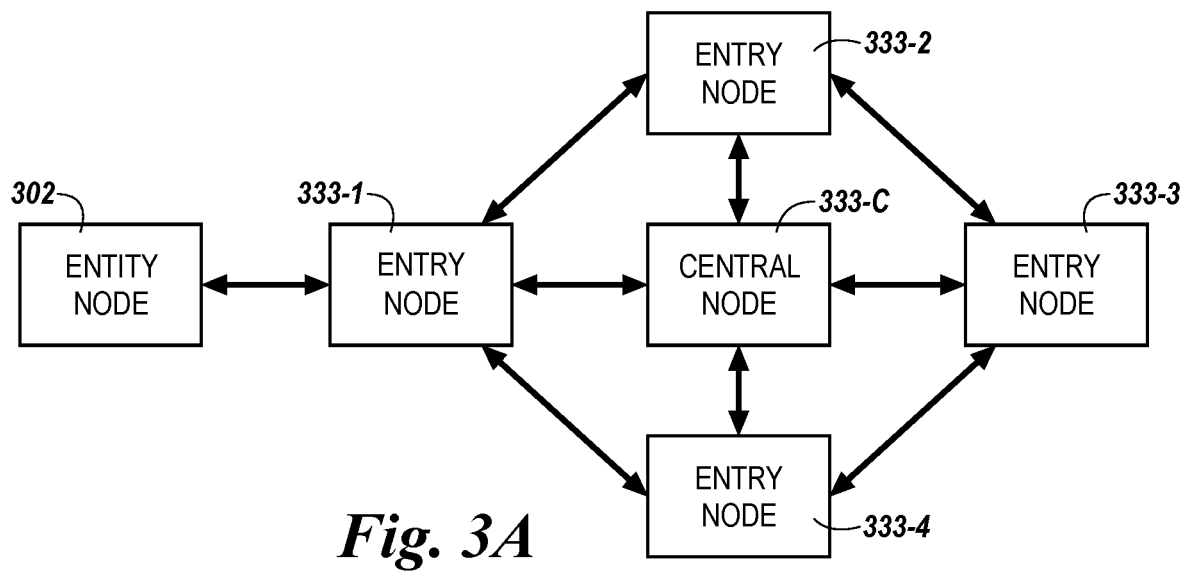
FIG. 3A is an example environment, including an entity node and a plurality of entry nodes in accordance with an embodiment of the present disclosure.

FIG. 3A illustrates an example environment, including a vehicular entity 302 and a plurality of nodes 333-1, 333-2, 333-3, 333-4 and a central node 333-C (hereinafter referred to collectively as entry nodes and central node 233) in accordance with an embodiment of the present disclosure. The central node 333-C can be a similar node to the entry nodes 333-1, 333-2, 333-3, 333-4 except that the central node 333-C is in command of the other nodes. In some examples, the central node 333-C can be a node that is not associated with a particular entry point (in contrast to entry nodes 333-1, 333-2, 333-3, 333-4).

As illustrated in FIG. 3, an entity node 302 can be a vehicular entity (such as vehicular entity 302). The entity node 302 can be in communication with a plurality of entry nodes 333-1, 333-2, 333-3, 333-4 and/or a central node 333-C. Likewise, each of the plurality of nodes 333 can be in communication with another of the plurality of nodes 333. As an example, entry node 333-1 can communicate with entry node 333-2, and so forth. Each of the entry nodes 333 can be in communication with the central node 333-C. As the entity node 302 approaches a first entry node 333-1, identity data, authentication data, etc., can be exchanged between the entity node 302 and the first entry node 333-1. The identity data can include a vehicle identification number (VIN), authentication keys (such as a public key, described below), a vehicular certificate, a plate number ID, driver data, a destination to be reached by entering the location, etc.

Figure 3B:
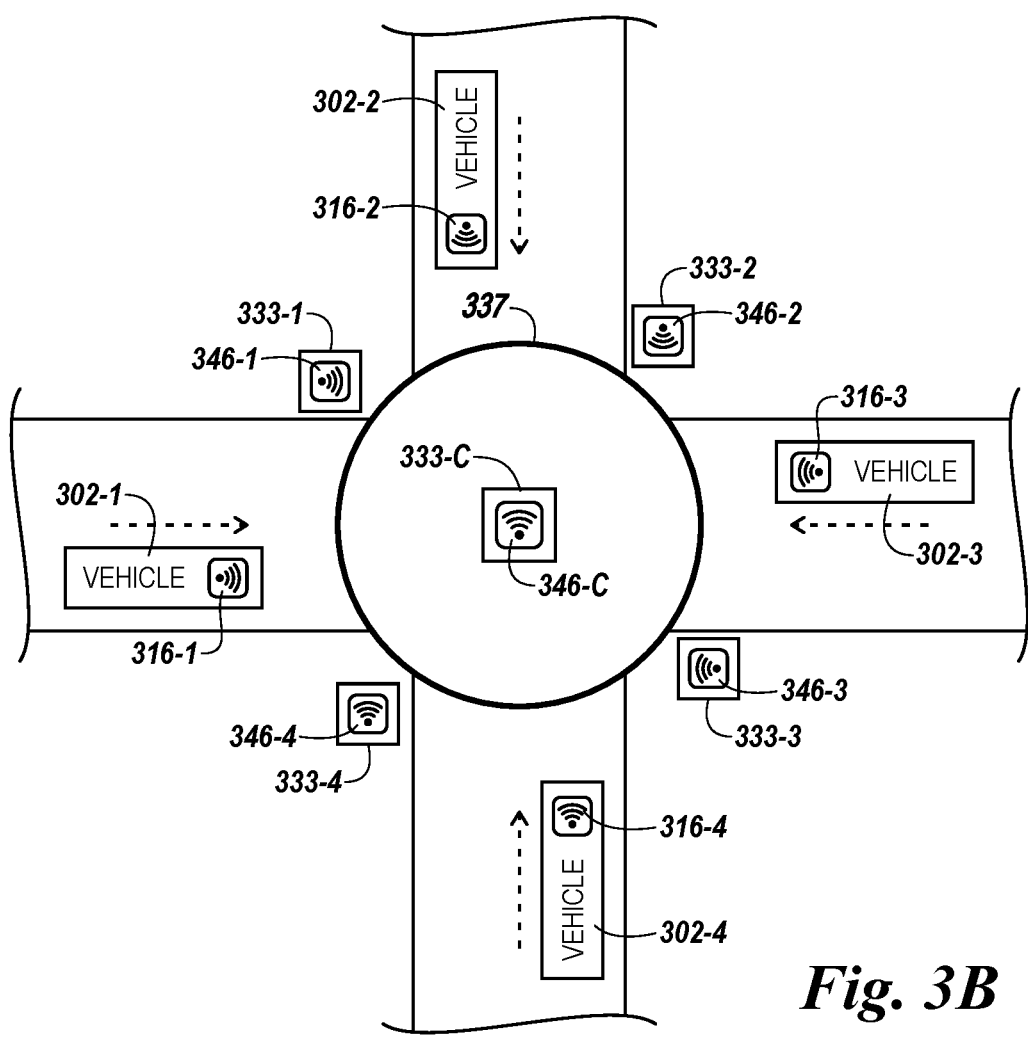
FIG. 3B is an example environment, including a plurality of vehicular communication components and a plurality of entrance communication components in accordance with an embodiment of the present disclosure.

FIG. 3B is an example environment, including a plurality of vehicular communication components 316-1, 316-2, 316-3, 316-4 (hereinafter referred to collectively as vehicular communication components 316) and a plurality of entrance communication components 346-1, 346-2, 346-3, 346-4 (hereinafter referred to collectively as entrance communication components 346) in accordance with an embodiment of the present disclosure. A first vehicular communication component 316-1 can be coupled to and/or be associated with a first vehicular entity 302-1. A second vehicular communication component 316-2 can be coupled to and/or be associated with a second vehicular entity 302-2, a third vehicular communication component 316-3 can be coupled to and/or associated with a third vehicular entity 302-3, and a fourth vehicular communication component 316-4 can be coupled to and/or be associated with a fourth vehicular entity 302-4. Likewise, an entrance communication component 346 can be coupled to and/or be associated with a corresponding entrance entity 333 (such as a gate, an entrance roadway, a checkpoint, etc.), as is illustrated in FIG. 3B.

As the first vehicular communication component 316-1 of the vehicular entity 302-1 approaches within a particular proximity of the entrance communication component 346 and therefore within proximity to a location 337 to be entered or accessed, data transfer can begin including identification data and authentication data of the vehicular entity 302-1 by the vehicular communication component 316-1. The particular proximity, in this example, can refer to a distance of between 50 cm, 500 meters, etc. Embodiments, however, are not limited to a particular proximity. In an example, the particular proximity can depend on a type of antenna (such as antenna 119 in FIG. 1 and antenna 249 in FIG. 2).

The communication between the first vehicular communication component 316-1 and the first entrance communication component 346-1 can include an exchange of identity data, authentication data, access request data, etc. The authentication data can include a public identification, a certificate identification, a public key, and a vehicular signature, as will be described further in association with FIGS. 5-9 below. Once the authentication data is verified by the first entrance entity 302-1, other data can be exchanged between and/or among the first, second, third, and fourth entrance communication components 346-1, 346-2, 346-3, 346-4. As an example, a block chain can be shared among the entrance communication components 346 and each of the entrance communication components 346 can be communicated with to verify an identity of the vehicular entity 302-1 and a location and/or request history of the vehicular entity 302-1. As an example, if one of the entrance communication components 346 included data in a block of the block chain that indicated that the vehicular entity attempting to gain access to the location 337 had already gained access and had not exited the location 337, access to the current vehicular entity attempting access would be denied. Put another way, two vehicular entities with the same identity data are not allowed into the location 337 at the same time and therefore if the block chain data indicates that a particular vehicular entity has already entered, a subsequent vehicular entity with the same identity data would be denied access.

As will be described further below, each of the entrance communication components 346 can store a local ledger block chain, as is described in association with FIGS. 10-14B, along with a local ledger block chain being used to store corresponding data relating to each vehicular entity. As an example, the first entrance communication component 346-1 can store local ledger block chain data that indicates all of the entering and exiting vehicles that have occurred. Accessing that particular local ledger block chain would provide data for that particular entrance point into the location 337. The second entrance communication component 346-2 can store a second local ledger block chain data that indicates all entering and exiting for that particular entrance point, and so forth with the third and fourth entrance communication components 346-3, 346-4. Likewise, a local ledger block chain can be associated with a particular vehicular entity such that the local ledger block chain indicates every time that particular vehicular entity has entered and exited the location 337, regardless of which entrance used and each particular entrance used can be indicated in the local ledger block chain associated with that vehicular entity.

Figure 4:
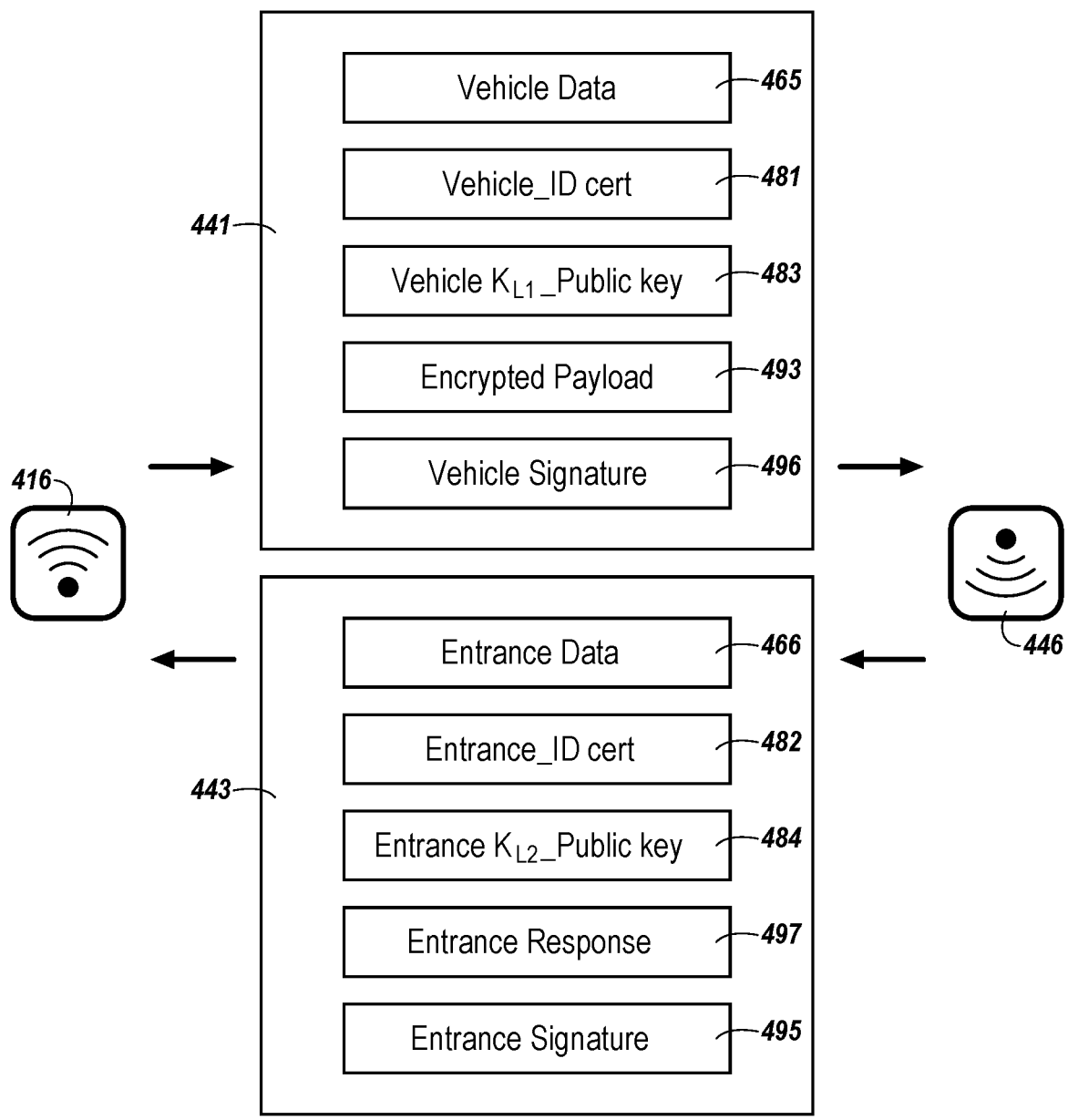
FIG. 4 is an example transmittal of authentication data between a vehicular communication component and an entrance communication component 4 in accordance with an embodiment of the present disclosure.

FIG. 4 is an illustration of an exchange of authentication data 441, 443 between a vehicular communication component 416 and an entrance communication component 446. The portion of authentication data 441 transmitted by the vehicular communication component 416 and received by the entrance communication component 446 can include vehicle data 465, a vehicular identification certificate ("Vehicle_ID cert") 481, a vehicular public key ("Vehicle $K_{L1}$_Public key") 483, an encrypted payload 493, and a vehicular signature ("Vehicle Signature") 496. The vehicular data 465 can include an entrance (e.g., gate) ID to be used to enter a location or roadway, location coordinates (e.g., GPS coordinates), a plate identification of the vehicle, insurance information associated with the vehicle, driver information, etc. The vehicle identification certificate 481 can be used to verify that the identity of the vehicular entity is authenticated. The vehicular public key 483 can be used to encrypt data to be sent to the entrance communication component 446 in order for the entrance communication component 446 to decrypt the received data using its own private key, as will be described further in association with FIGS. 5-9. The encrypted payload 493 can include encrypted data such as a plate number or ID, insurance numbers, driver information, an eventual destination of the vehicle, etc. (similar to 465 but encrypted for added security).

A vehicular signature 496 is used to verify that the data is sent from an authorized entity such that data with this verifiable signature is from the sender that the vehicular entity is claiming to be. The vehicular signature 496 is generated by encrypting the signature using the vehicular private key (which is private only to that vehicular entity) and is decrypted using the publicly provided vehicular public key. A further description of the signature verification is described below in association with FIG. 9.

The portion of authentication data 443 transmitted by the entrance communication component 446 and received by the vehicular communication component 416 can include entrance data 466, an entrance identification certificate ("Entrance_ID cert") 482, an entrance public key ("Entrance_$K_{L2}$_Public key") 484, an entrance response 497, and an entrance signature ("Entrance Signature") 495. The entrance data 466 can include a gate identification (e.g., location, name, etc.), location data (e.g., GPS coordinates), among other data. The entrance identification certificate 482 can be used to verify that the identity of the entrance device is authenticated. The entrance public key 484 can be used to encrypt data to be sent to the entrance communication component 446 in order for the entrance communication component 446 to decrypt the received data using its own private key, as will be described further in association with FIGS. 5-9. The entrance response 497 can indicate whether the vehicular entity has been authenticated and is allow to access a location and/or can provide a reason for the acceptance or rejection of the entrance.

An entrance signature 495 is used to verify that the data is sent from an authorized entity such that data with this verifiable signature is from the sender that the entrance entity is claiming to be. The entrance signature 495 is generated by encrypting the signature using the entrance private key (which is private to only that entrance entity) and is decrypted using the publicly provided entrance public key. A further description of the signature verification is described below in association with FIG. 9.

These public keys (vehicular and entrance) can be used to encrypt data sent to each respective communication component and verify an identity of each in order to exchange vehicular and/or entrance data. As an example, as will described further below in association with FIGS. 5-9, the vehicular communication component 416 can encrypt data using the received entrance public key 484 and send the encrypted data to the entrance communication component 446. Likewise, the entrance communication component 446 can encrypt data using the received vehicular public key 483 and send the encrypted data to the vehicular communication component 416. Data, such as vehicle data sent by the entrance communication component 446 can include entrance location data, entrance identity data, etc. Confirmation of receipt of the vehicle data can be sent with a digital signature to verify an identity of the vehicular communication component 416.

In an example, data exchanged between the vehicular communication component 416 and the entrance communication component 446 can have a freshness used by the other. As an example, data sent by the vehicular communication component 416 to the entrance communication component 446 in receipt of the vehicle and/or entrance data can be altered at each of a particular time frame or for a particular amount of data being sent. This can prevent a hacker from intercepting previously sent data and sending the same data again to result in the same outcome. If the data has been slightly altered but still indicates a same instruction, the hacker may send the identical information at a later point in time and the same instruction would not be carried out due to the recipient expecting the altered data to carry out the same instruction.

The data exchanged between the vehicular communication component 416 and the entrance communication component 446 can be performed using a number of encryption and/or decryption methods as described below. The securing of the data can insure that nefarious activity is prevented from interfering with the vehicle data provided to the vehicular entity and/or the entrance entity.

Figure 5:
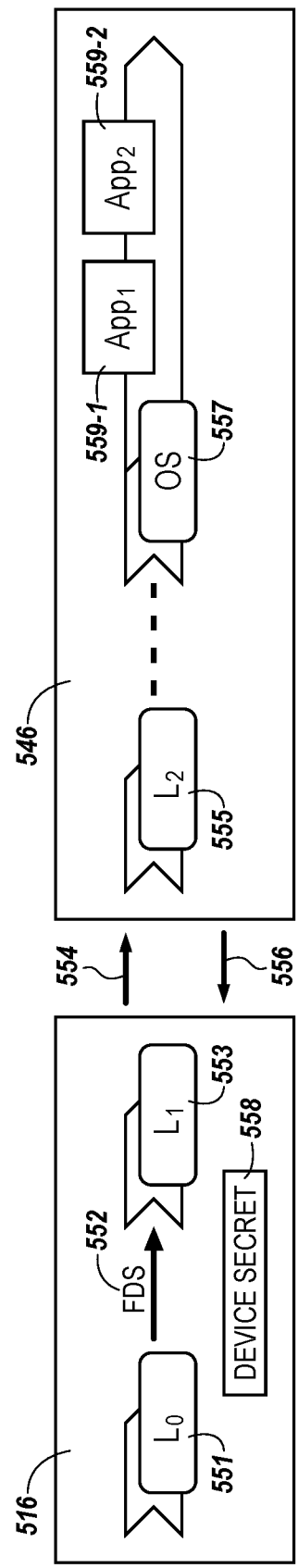
FIG. 5 is a block diagram of an example system including a vehicular communication component and an entrance communication component in accordance with an embodiment of the present disclosure.

FIG. 5 is a block diagram of an example system including a vehicular communication component 516 and an entrance communication component 546 in accordance with an embodiment of the present disclosure. As a vehicular entity (e.g., 102 in FIG. 1) comes in close proximity to an entrance entity (e.g., entrance entity 233 in FIG. 2), the associated entrance communication component 546 (e.g., 446 in FIG. 4) of the entrance entity can exchange data with the vehicular communication component 516 of the vehicular entity using a sensor (e.g., a radio frequency identification sensor (RFID)).

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the vehicular communication component 516. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the vehicular communication component 516.

The vehicular communication component 516 can transmit data, as illustrated by arrow 554, to the entrance communication component 546. The transmitted data can include a vehicular identification that is public (e.g., 465 in FIG. 4), a certificate (e.g., a vehicular identification certificate 481), and/or a vehicular public key (e.g., 483). Layer 2 ("L$_2$") 555 of the entrance communication component 546 can receive the transmitted data and execute the data in operations of the operating system ("OS") 557 and on a first application 559-1 and a second application 559-2.

In an example operation, the vehicular communication component 516 can read the device secret 558, hash an identity of Layer 1 553, and perform a calculation including:

$$K_{L1}=\text{KDF}[Fs(s),\text{Hash}(\text{"immutable information"})]$$

where $K_{L1}$ is a vehicular public key, KDF (e.g., KDF defined in the National Institute of Standards and Technology (NIST) Special Publication 800-108) is a key derivation function (i.e., HMAC-SHA256), and Fs(s) is the device secret 558. FDS 552 can be determined by performing:

$$\text{FDS}=\text{HMAC-SHA256}[Fs(s),\text{SHA256}(\text{"immutable information"})]$$

Likewise, the entrance communication component 546 can transmit data, as illustrated by arrow 556, including an entrance identification that is public (e.g., entrance public identification 466), an entrance certificate (e.g., a vehicular identification certificate 482), and/or an entrance public key (e.g., public key 484).

Figure 6:
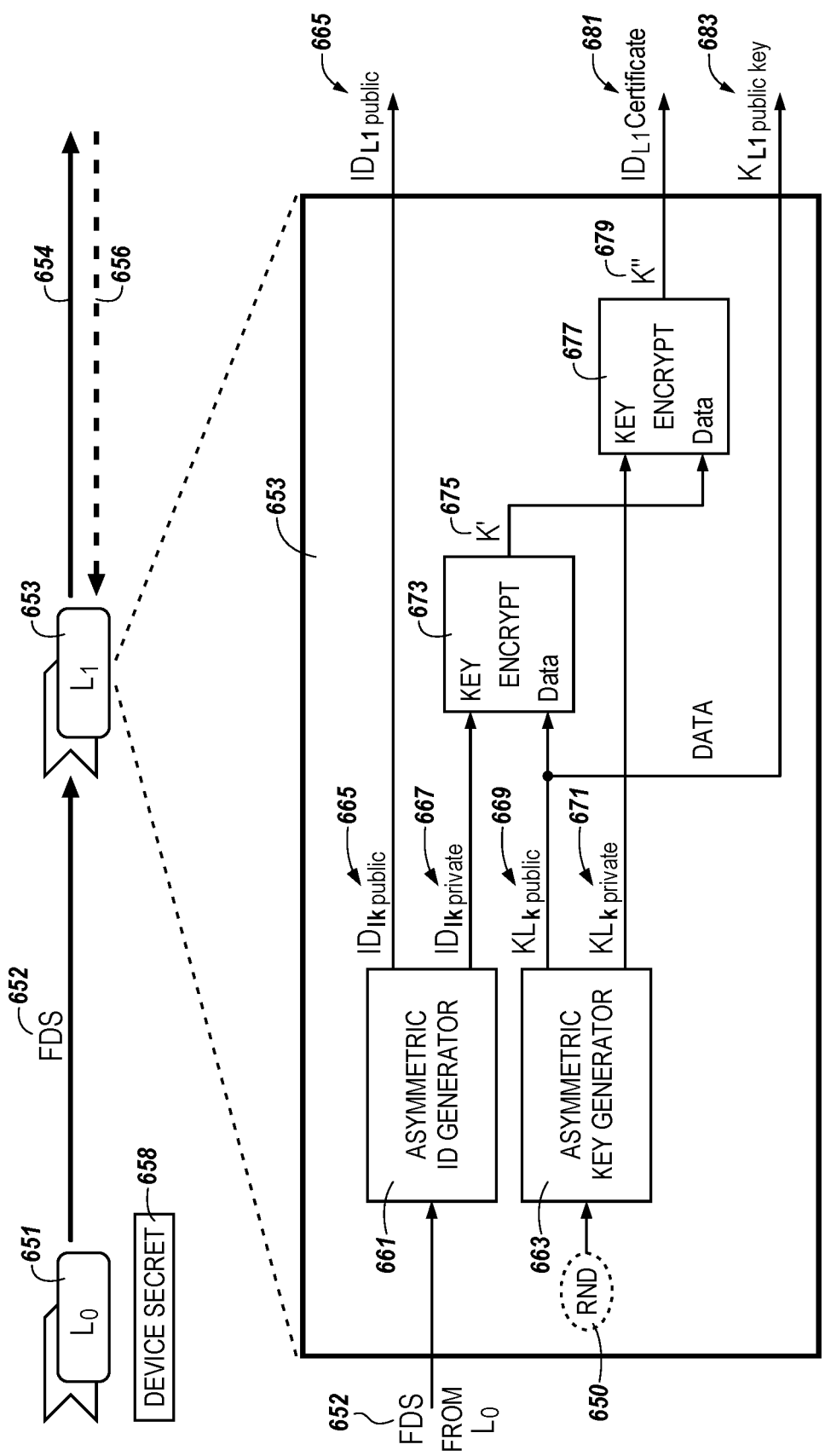
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the vehicular public identification, the vehicular certificate, and the vehicular public key that are then sent, indicated by arrow 654, to Layer 2 (e.g., Layer 2 555) of an entrance communication component (e.g., 546 in FIG. 5). Layer 0 ("L$_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("ID$_{lk\ public}$") 665 and a private identification 667. In the abbreviated "ID$_{lk\ public}$," the "lk" indicates Layer k (in this example Layer 1), and the "public" indicates that the identification is openly shared. The public identification ("ID$_{L1public}$") 665 is illustrated as shared by the arrow extending to the right and outside of Layer 1 653 of the vehicular communication component. The generated private identification 667 is used as a key input into an encryptor 673. The encryptor 673 can be any processor, computing device, etc. used to encrypt data.

Layer 1 653 of a vehicular communication component can include an asymmetric key generator 663. In at least one example, a random number generator (RND) 650 can optionally input a random number into the asymmetric key generator 663. The asymmetric key generator 663 can generate a public key ("K$_{Lk\ public}$") 683 (referred to as a vehicular public key) and a private key ("K$_{LK\ private}$") 671 (referred to as a vehicular private key) associated with a vehicular communication component such as vehicular communication component 516 in FIG. 5. The vehicular public key 683 can be an input (as "data") into the encryptor 673. The encryptor 673 can generate a result K'675 using the inputs of the vehicular private identification 667 and the vehicular public key 683. The vehicular private key 671 and the result K'675 can be input into an additional encryptor 677, resulting in output K" 679. The output K" 679 is the vehicular certificate ("ID$_{L1\ certificate}$") 681 transmitted to the Layer 2 (555 of FIG. 5). The vehicular certificate 681 can provide an ability to verify and/or authenticate an origin of data sent from a vehicular entity. As an example, data sent from the vehicular communication component can be associated with an identity of the vehicular communication component by verifying the certificate, as will be described further in association with FIG. 8. Further, the vehicular public key ("K$_{L1\ public\ key}$") 683 can be transmitted to Layer 2. Therefore, the public identification 665, the certificate 681, and the vehicular public key 683 of a Layer 1 653 of a vehicular communication component can be transmitted to Layer 2 of an entrance communication component.

Figure 7:
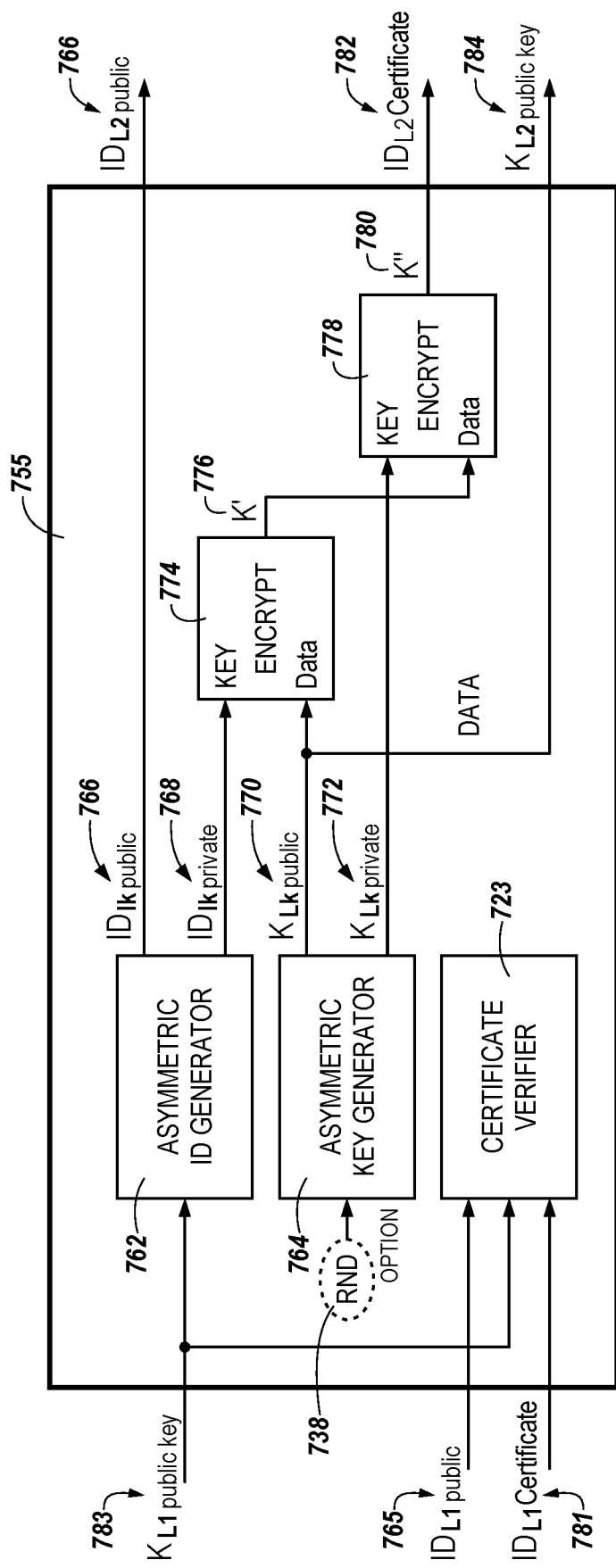
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of an entrance communication component (e.g., entrance communication component 546 in FIG. 5) generating an entrance identification ("ID$_{L2\ public}$") 766, an entrance certificate ("ID$_{L2\ Certificate}$") 782, and a entrance public key ("K$_{L2\ public\ key}$") 784.

The entrance public key ("K$_{L1\ public\ key}$") 783 transmitted from Layer 1 of the entrance communication component to Layer 2 755 of a vehicular communication component, as described in FIG. 6, is used by an asymmetric ID generator 762 of the entrance communication component to generate a public identification ("ID$_{lk\ public}$") 766 and a private identification 768 of the entrance communication component. In the abbreviated "ID$_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

As shown in FIG. 7, the entrance certificate 781 and entrance identification 765, along with the entrance public key 783, are used by a certificate verifier 723. The certificate verifier 723 can verify the entrance certificate 781 received from a host (e.g., host 516), and determine, in response to the entrance certificate 781 being verified or not being verified, whether to accept or discard data received from the host. Further details of verifying the entrance certificate 781 are described in connection with FIG. 8.

Layer 2 755 of the entrance communication component can include an asymmetric key generator 764. In at least one example, a random number generator (RND) 738 can optionally input a random number into the asymmetric key generator 764. The asymmetric key generator 764 can generate a public key ("K$_{Lk\ public}$") 770 (referred to as an entrance public key) and a private key ("K$_{LK\ private}$") 772 (referred to as an entrance private key) associated with an entrance communication component such as entrance communication component 546 in FIG. 5. The entrance public key 770 can be an input (as "data") into the encryptor 774.

The encryptor 774 can generate a result K' 776 using the inputs of the entrance private identification 768 and the entrance public key 770. The entrance private key 772 and the result K' 776 can be input into an additional encryptor 778, resulting in output K" 780. The output K" 780 is the entrance certificate ("$ID_{L2\ certificate}$") 782 transmitted back to the Layer 1 (553 of FIG. 5). The entrance certificate 782 can provide an ability to verify and/or authenticate an origin of data sent from an apparatus. As an example, data sent from the entrance communication component can be associated with an identity of the entrance communication component by verifying the certificate, as will be described further in association with FIG. 8. Further, the entrance public key ("$K_{L2\ public\ key}$") 784 can be transmitted to Layer 1. Therefore, the public identification 766, the certificate 782, and the entrance public key 784 of the entrance communication component can be transmitted to Layer 1 of an vehicular communication component (and vice versa in the other direction with the elements of the vehicular communication component being sent to the entrance communication component).

In an example, in response to a vehicular communication component receiving a public key from an entrance communication component, the vehicular communication component can encrypt data to be sent to the entrance communication component using the entrance public key. Vice versa, the entrance communication component can encrypt data to be sent to the vehicular communication component using the vehicular public key. In response to the vehicular communication component receiving data encrypted using the vehicular public key, the vehicular communication component can decrypt the data using its own vehicular private key. Likewise, in response to the entrance communication component receiving data encrypted using the entrance public key, the entrance communication component can decrypt the data using its own entrance private key. As the vehicular private key is not shared with another device outside the vehicular communication component and the entrance private key is not shared with another device outside the entrance communication component, the data sent to the vehicular communication component and the entrance communication component remains secure.

Figure 8:
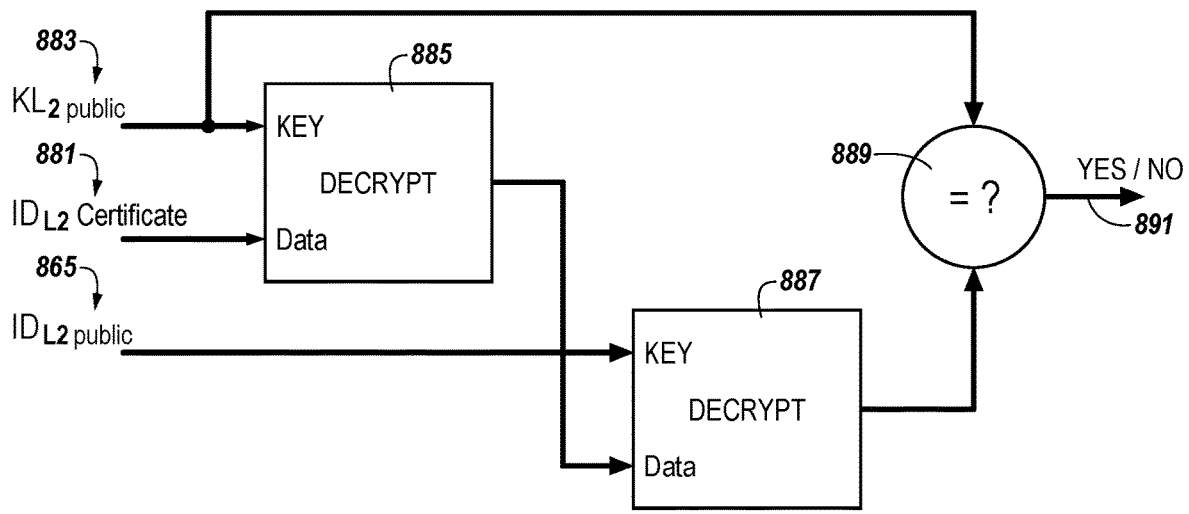
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification 865 is provided from a vehicular communication component (e.g., from Layer 1 553 of vehicular communication component 516 in FIG. 5). The data of the certificate 881 and the vehicular public key 883 can be used as inputs into a decryptor 885. The decryptor 885 can be any processor, computing device, etc. used to decrypt data. The result of the decryption of the certificate 881 and the vehicular public key 883 can be used as an input into a secondary decryptor 887 along with the public identification 865, resulting in an output. The vehicular public key 883 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
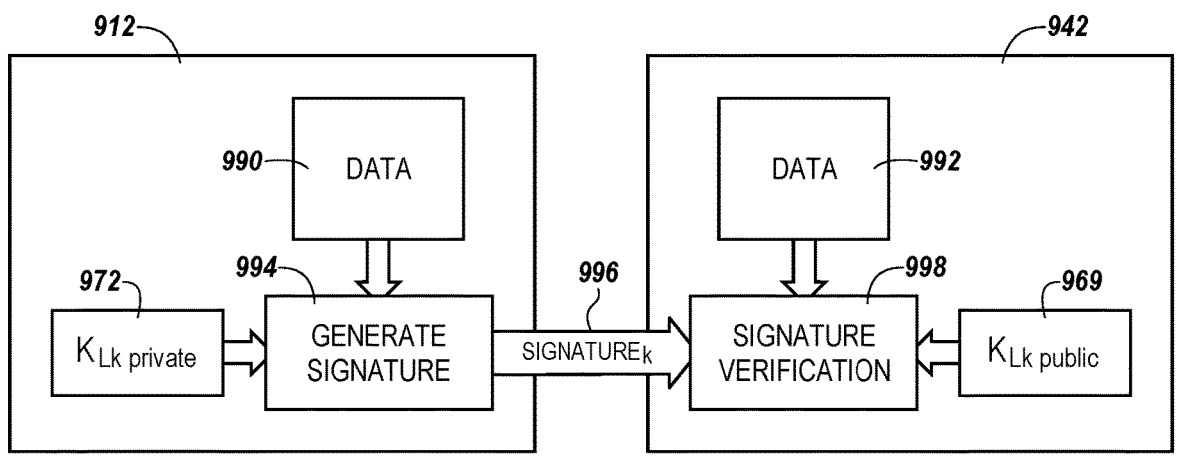
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicular computing device 912 (such as vehicle computing device 112 in FIG. 1) can send data 990 to a vehicular computing device (such as entrance computing device 112 in FIG. 1). The vehicular computing device 912 can generate, at 994, a signature 996 using a vehicular private key 972. The signature 996 can be transmitted to the entrance computing device 942. The entrance computing device 942 can verify, at 998, using data 992 and the vehicular public key 969 previously received. In this way, signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

Figure 10:
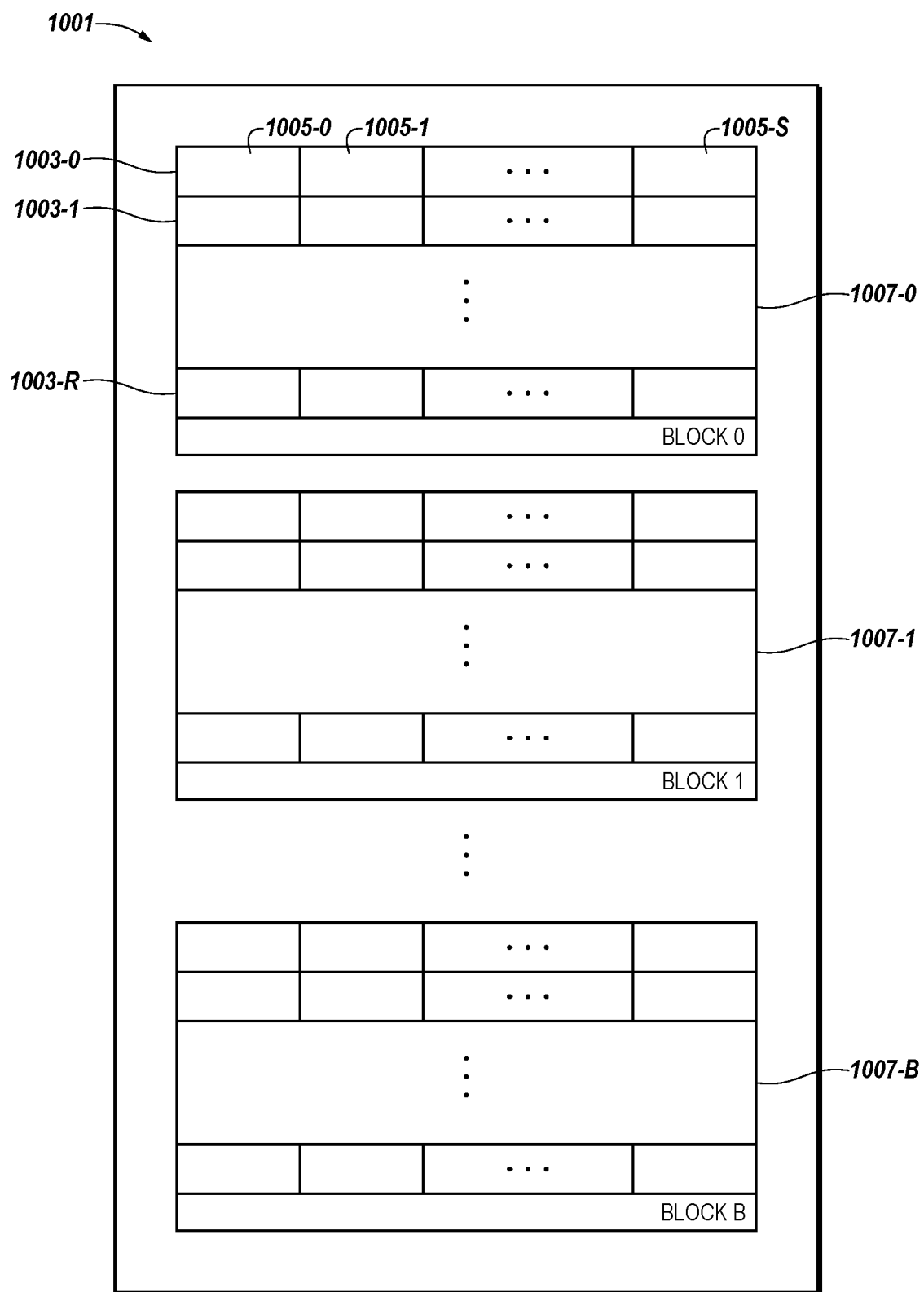
FIG. 10 illustrates a diagram of a portion of a memory array having a number of physical blocks in accordance with an embodiment of the present disclosure.

FIG. 10 illustrates a diagram of a portion of a memory array 1001 having a number of physical blocks in accordance with an embodiment of the present disclosure. Memory array 1001 can be, for example, a flash memory array such as a NAND, and/or NOR flash memory array. In one example embodiment, the memory 1001 is a NOR flash memory array 1001. As an additional example, memory array 1001 can be a resistance variable memory array such as a PCRAM, RRAM, MMRAM, or spin torque transfer (STT) array, among others. However, embodiments of the present disclosure are not limited to a particular type of memory array. Further, memory array 1001 can be a secure memory array, as will be further described herein. Further, although not shown in FIG. 10, memory array 1001 can be located on a particular semiconductor die along with various peripheral circuitry associated with the operation thereof.

As shown in FIG. 10, memory array 1001 has a number of physical blocks 1007-0 (BLOCK 0), 1007-1 (BLOCK 1), . . . , 1007-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 1001 may be 128 blocks, 512 blocks, or 1,024 blocks, but embodiments are not limited to a particular power of two or to any particular number of physical blocks in memory array 1001.

A number of physical blocks of memory cells (e.g., blocks 1007-0, 1007-1, . . . , 1007-B) can be included in a plane of memory cells, and a number of planes of memory cells can be included on a die. For instance, in the example shown in FIG. 10, each physical block 1007-0, 1007-1, . . . , 1007-B can be part of a single die. That is, the portion of memory array 1001 illustrated in FIG. 10 can be a die of memory cells.

As shown in FIG. 10, each physical block 1007-0, 1007-1, . . . , 1007-B includes a number of physical rows (e.g., 1003-0, 1003-1, . . . , 1003-R) of memory cells coupled to access lines (e.g., word lines). The number of rows (e.g., word lines) in each physical block can be 32, but embodiments are not limited to a particular number of rows 1003-0, 1003-1, . . . , 1003-R per physical block. Further, although not shown in FIG. 10, the memory cells can be coupled to columns of sense lines (e.g., data lines and/or digit lines).

As one of ordinary skill in the art will appreciate, each row 1003-0, 1003-1, . . . , 1003-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 1003-0, 1003-1, . . . , 1003-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 10, a page of memory cells can comprise a number of physical sectors 1005-0, 1005-1, . . . , 1005-S (e.g., subsets of memory cells). Each physical sector 1005-0, 1005-1, . . . , 1005-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 1005-0, 1005-1, . . . , 1005-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 1007-0, 1007-1, . . . , 1007-B, rows 1003-0, 1003-1, . . . , 1003-R, sectors 1005-0, 1005-1, . . . , 1005-S, and pages are possible. For example, rows 1003-0, 1003-1, . . . , 1003-R of physical blocks 1007-0, 1007-1, . . . , 1007-B can each store data corresponding to a single logical sector which can include, for example, more or less than 512 bytes of data.

Figure 11A:
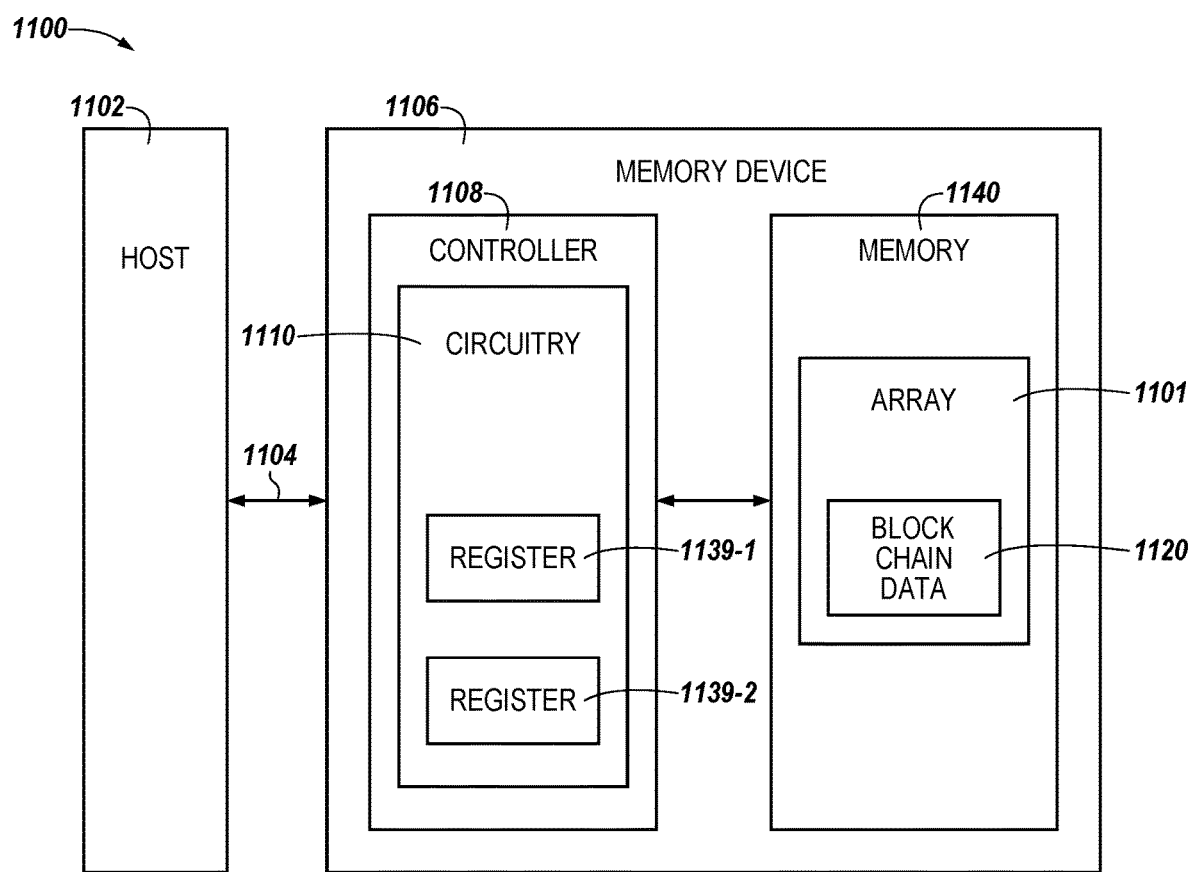
FIG. 11A is a block diagram of a computing system including a host and an apparatus in the form of a memory device in accordance with an embodiment of the present disclosure.

FIG. 11A is a block diagram of a computing system 1100 including a host 1102 and an apparatus in the form of a memory device 1106 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 1100 can include a number of memory devices analogous to memory device 1106. In one example embodiment, as shown more in FIG. 11B, computing system 1100 may represent a node within a larger network of nodes such as a distributed, peer to peer network.

In the embodiment illustrated in FIG. 11A, memory device 1106 can include a memory 1140 having a memory array 1101. As shown in FIG. 11A, memory 1140 can store "block chain data" 1120, used in block chain technology systems, in the memory array 1101. A "block" of block chain data in a block chain technology system can include data (e.g., payload), headers, encryption, history, timestamps, etc. As will be described further herein in connection with FIGS. 12 and 13, the block chain data 1120 may be "local block chain" data and/or "global block chain" data and may include a stored global block chain ledger (e.g., "global ledger block chain" data) and/or a stored local block chain ledger (e.g., "local ledger block chain" data).

Memory array 1101 can be analogous to memory array 1001 previously described in connection with FIG. 10. However, as used herein a block of block chain data in a block chain architecture does not have to equate to the size of a block of memory as described previously in connection with FIG. 1. Hence, the term "global block" and/or "local block", when stored in memory in memory as block chain data, do not have to equate to a block size unit of memory. A global block and/or local block may be smaller, equivalent, and/or larger than a block size unit, e.g., denomination, associated with a particular memory architecture or design. Further, memory array 1101 can be a secure array, as will be further described herein in connection with FIGS. 14A and 14B. Although one memory array 1101 is illustrated in FIG. 11A, memory 1140 can include any number of memory arrays analogous to memory array 1101.

As illustrated in FIG. 11A, host 1102 can be coupled to the memory device 1106 via interface 1104. Host 1102 and memory device 1106 can communicate (e.g., send commands and/or data such as block chain data 1120) on interface 1104. Host 1102 and/or memory device 1106 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 1104 can be in the form of a standardized physical interface. For example, when memory device 1106 is used for information storage in computing system 1100, interface 1104 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. Interface 1104 can provide an interface for passing control, address, information (e.g., data), and other signals between memory device 1106 and a host (e.g., host 1102) having compatible receptors for interface 1104.

Memory device 1106 includes controller 1108 to communicate with host 1102 and with memory 1140 (e.g., memory array 1101). For instance, controller 1108 can send commands to perform operations on memory array 1101, including operations to sense (e.g., read), program (e.g., write), move, and/or erase data (e.g., "local" and/or "global" block chain data), among other operations. Again, the intended meaning of the terms "global block" and/or "local block" for block chain data in block chain technology and systems are defined in connection with FIGS. 12 and 13.

Controller 1108 can be included on the same physical device (e.g., the same die) as memory 1140. Alternatively, controller 1108 can be included on a separate physical device that is communicatively coupled to the physical device that includes memory 1140. In an embodiment, components of controller 1108 can be spread across multiple physical devices (e.g., some components on the same die as the memory, and some components on a different die, module, or board) as a distributed controller.

Host 1102 can include a host controller (not shown FIG. 11A) to communicate with memory device 1106. The host controller can send commands to memory device 1106 via interface 1104. The host controller can communicate with memory device 1106 and/or the controller 1108 on the memory device 1106 to read, write, and/or erase data (e.g., "local" and/or "global" block chain data), among other operations. Further, in an embodiment, host 1102 can be an IoT enabled device, as previously described herein, having IoT communication capabilities.

Figure 12:
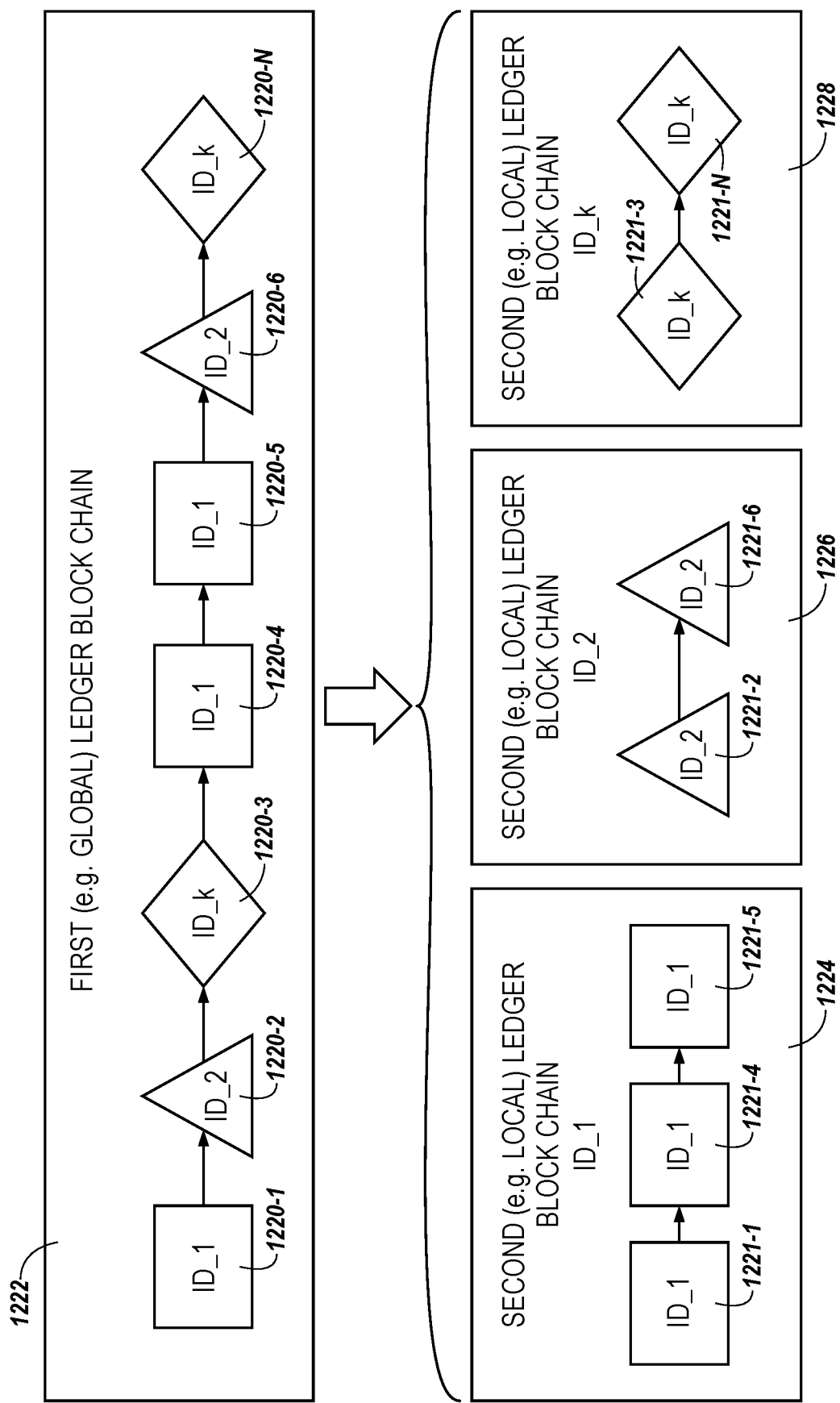
FIG. 12 illustrates an example of an exchange between a global ledger block chain and local ledger block chains as can be operated upon by circuitry and stored in a memory for secure updates stored in memory in accordance with an embodiment of the present disclosure.
Figure 13:
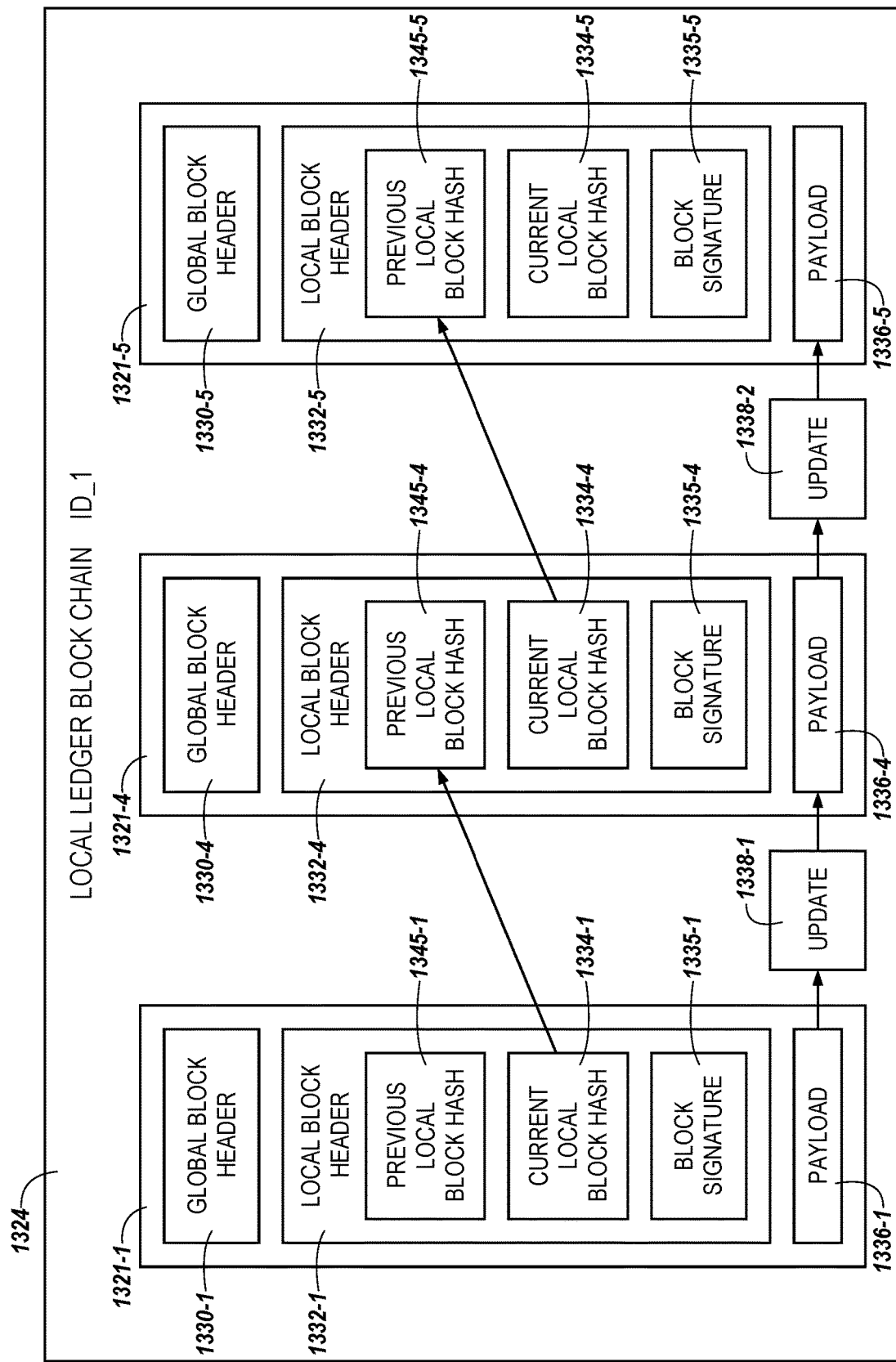
FIG. 13 illustrates an example of a local ledger block chain for secure updates stored in memory in accordance with an embodiment of the present disclosure.

Controller 1108 on memory device 1106 and/or the host controller on host 1102 can include control circuitry and/or logic (e.g., hardware and firmware) configured to perform the block chain operations described herein, e.g., in connection with FIGS. 12 and 13, according to, for example DICE-RIoT architecture and/or protocol. In an embodiment, controller 1108 on memory device 1106 and/or the host controller on host 1102 can be an application specific integrated circuit (ASIC) coupled to a printed circuit board including a physical interface. Also, memory device 1106 and/or host 1102 can include a buffer of volatile and/or non-volatile memory and a number of registers.

For example, as shown in FIG. 11A, memory device can include circuitry 1110. In the embodiment illustrated in FIG. 11A, circuitry 1110 is included in controller 1108. However, embodiments of the present disclosure are not so limited. For instance, in an embodiment, circuitry 1110 may be included in (e.g., on the same die as) memory 1140 (e.g., instead of in controller 1108). Circuitry 1110 can comprise, hardware, firmware, and/or communicate instructions to a processing resource to perform the block chain operations described herein, e.g., in connection with FIGS. 12 and 13 using encryption techniques explained in FIGS. 5-9, according to, for example DICE-RIoT architecture and/or protocol.

For example, circuitry 1110 can be configured to receive a global block of block chain data (defined in FIGS. 12 and 13) to be added as a local block of block chain data, e.g., 1120, on a local ledger block chain (also defined in FIGS. 12 and 13) within an array 1101 in memory 1140. For example, a local block of block chain data, e.g., 1120, may be a validated received global block of block chain data and may be generated and/or added to the local ledger block chain (shown in FIGS. 12 and 13) for validating (e.g., authenticating and/or attesting) an update to data stored in memory 1140 (e.g., in memory array 1101). The global block to be added as a local block in the local ledger block chain can include multiple headers.

In an embodiment, a subset of array 1101, or the whole array 1101 can be a secure array (e.g., an area of memory 1140 to be kept under control). FIG. 11A illustrates a pair of registers 1139-1 and 1139-2 although embodiments are not so limited, and one or more registers could be used. For example, the data stored in memory array 1101 can include sensitive (e.g., non-user) data, such as host firmware and/or code to be executed for sensitive applications. In such an embodiment, a pair of non-volatile registers can be used to define the secure array. For example, in the embodiment illustrated in FIG. 11A, circuitry 1110 includes registers 1139-1 and 1139-2 that can be used to define the secure array. For instance, register 1139-1 can define the address (e.g., the starting LBA of the data) of the secure array, and register 1139-2 can define the size (e.g., the ending LBA of the data) of the secure array. An example of such registers, and their use in defining a secure array, will be further described herein in connection with FIGS. 14A-14B).

Once the secure array has been defined, circuitry 1110 can be used to generate (e.g., calculate) a cryptographic hash associated with the secure array, which may be referred to herein as a golden hash, using authenticated and antireplay protected commands (e.g., so that only memory device 1106 knows the golden hash, and only memory device 1106 is capable of generating and updating it). The golden hash may be stored in inaccessible portion of memory array 1101 (e.g., the same inaccessible portion in which block chain data 1120 and the local ledger block chain is stored) and can be used during the process of validating the data of the secure array.

In one example embodiment, memory device 1106 (e.g., using circuitry 1110) can send, via interface 1104, the block chain data 1120 (which may be a received global block from the global ledger block chain), along with the digital signature associated with block chain data 1120, to the host 1102 for validation of the update (e.g., the payload of the block chain data) before updating data stored in memory array 1101. For example, circuitry 1110 can sense (e.g., read) the block chain data 1120 received and stored in memory array 1101, and send the sensed block chain data 1120 to host 1102 for validation of the update to the data stored in array 1101, responsive to a powering (e.g., a powering on and/or powering up) of memory device 1106. As such, a validation of the update to the data stored in memory array 1101 can be initiated (e.g., automatically) upon the powering of memory device 1106.

As an additional example, circuitry 1110 can send the block chain data 1120, along with the digital signature associated with block chain data 1120, to host 1102 upon an external entity, such as host 1102, initiating a validation of an update to the data stored in memory array 1101. For instance, host 1102 can send a command to memory device 1106 (e.g., circuitry 1110) to sense the block chain data 1120, and circuitry 1110 can operate on the command to sense the block chain data 1120 and send the sensed block chain data 1120 to host 1102 for validation of the data stored in array 1101, responsive to receipt of the command.

Upon receiving the block chain data 1120, host 1102 can validate (e.g., determine whether to validate) the data stored in memory array 1101 using the received block (e.g., the payload of the received global block). For example, as will be explained further in connection with FIGS. 12 and 13, host 1102 can use the cryptographic hash of the previous block in the block chain and the cryptographic hash of the data stored in memory array 1101 to validate the data. Further, host 1102 can validate the digital signature associated with the block chain data 1120 to determine the local block is included (e.g., is eligible to be included) in the local ledger block chain. As used herein, validating the update to the data stored in memory array 1101 can include, and/or refer to, authenticating and/or attesting that the update is genuine (e.g., is the same as originally programmed), and has not been altered by hacking activity, frequently provided by a hacker, or other including unauthorized changes.

In embodiments in which memory array 1101 is a secure array, a golden hash, as described further in connection with FIGS. 12 and 13, may also be used to validate the update to the data stored in memory array 1101. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1102.

In one example embodiment, in addition to the validation of the data stored in memory array 1101, circuitry 1110 can validate the block chain data 1120 (e.g., the received global block from the global ledger block chain) to determine if the block chain data 1120 is from an authorized entity (e.g., a known entity), and that the hash indicated on the received block chain data 1120 matches the most recent local block of block chain data on the local ledger block chain. In response to the validation of the block chain data 1120, the circuitry 1110 can be configured to provide the update included in the block chain data 1120 to augment, modify, and/or replace code (or a portion of code) stored in the secure array.

As will be explained further in connection with FIGS. 12 and 13, after the validation of the block chain data 1120 serving as a local block in a local ledger block chain stored in memory array 1101, circuitry 1110 can generate an additional (e.g., the next) local block (e.g., receive the next global block form the global ledger block chain) to be added to the local ledger block chain for updating the data stored in memory array 1101, in a manner analogous to which the previous block chain data 1120 was generated/received. For example, this additional local block of block chain data 1120 can include a cryptographic hash of the previous block in the local ledger block chain, and a new cryptographic hash of a new update to the data stored in memory array 1101. Further, this additional local block can include a header having a timestamp indicating when this block was generated (e.g., received as an additional global block), and can have a digital signature associated therewith that indicates this additional local block is from an authorized entity and may be included in the local ledger block chain. An example illustrating such an additional local block will be further described herein (e.g., in connection with FIG. 3). Further, in embodiments in which memory array 1101 is a secure array, an additional (e.g., new) golden hash can be generated.

The additional local block of block chain data, as well as the digital signature associated with the additional local block, and the additional golden hash, can be stored in memory array 1101 as part of the local ledger block chain. For example, the additional local block can replace the block chain data 1120 (e.g., the previous block chain data 1120) in memory array 1101. The additional block chain data, digital signature, and additional golden hash can then be used by host 1102 to validate the update (e.g., the payload) to the data stored in memory array 1101, in a manner analogous to that previously described herein for block chain data 1120. Additional local blocks in the local ledger block chain can continue to be generated by circuitry 1110 when they are received as global blocks, validated by the host 1102, and used by host 1102 to validate the update to the data stored in memory array 1101, in such manner throughout the lifetime of memory device 1106.

The embodiment illustrated in FIG. 11A can include additional circuitry, logic, and/or components not illustrated so as not to obscure embodiments of the present disclosure. For example, memory device 1106 can include address circuitry to latch address signals provided over I/O connectors through I/O circuitry. Address signals can be received and decoded by a row decoder and a column decoder, to access memory array 1101. Further, memory device 1106 can include a main memory, such as, for instance, a DRAM or SDRAM, that is separate from and/or in addition to memory array 1101. An example further illustrating additional circuitry, logic, and/or components of memory device 1106 will be further described herein (e.g., in connection with FIG. 15).

Figure 11B:
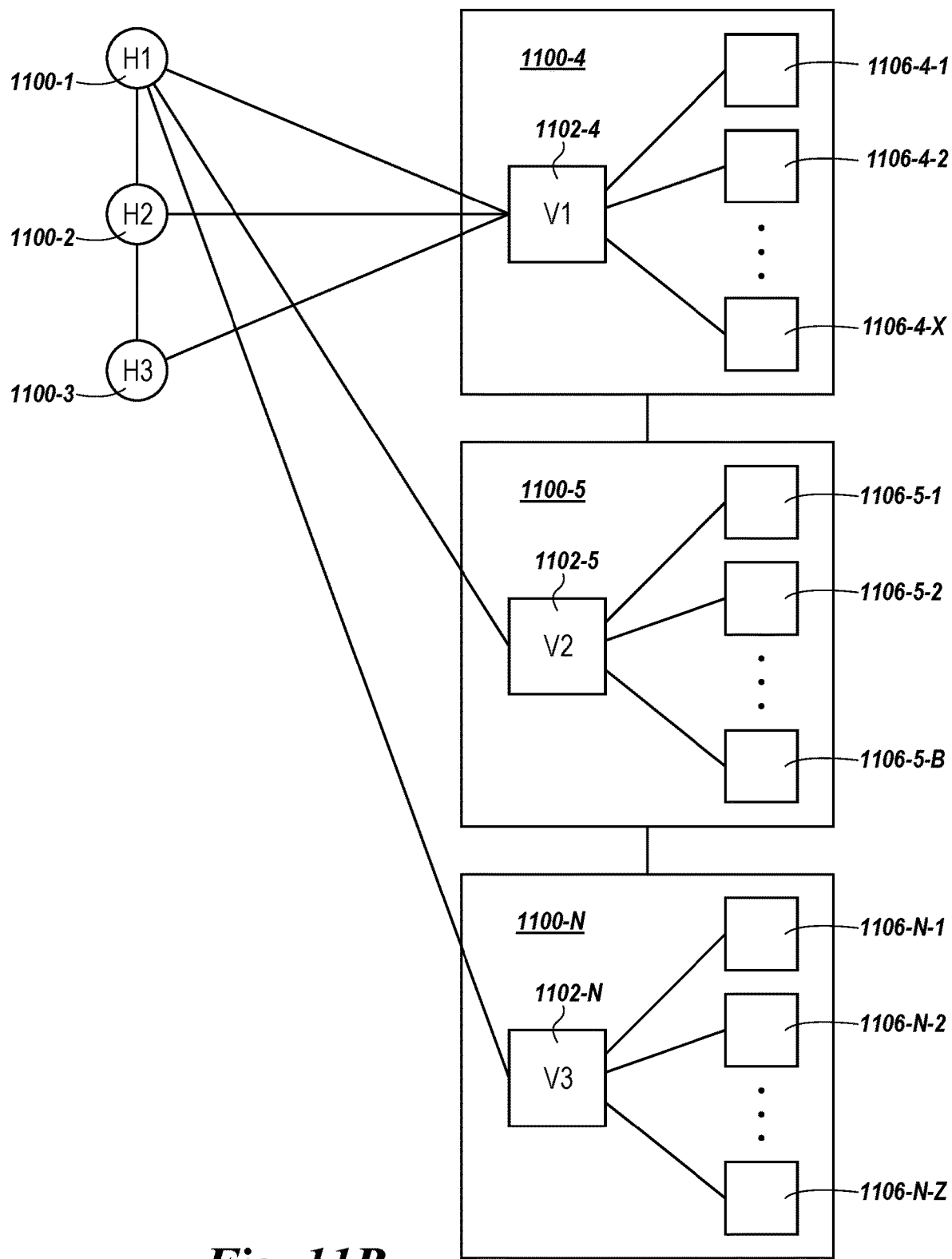
FIG. 11B is a block diagram of a network of computing systems which can include many computing nodes in a public and/or private network connected in a wired and/or wireless manner using wireless protocols such as peer to peer to peer and Internet Protocol (IP) in accordance with an embodiment of the present disclosure.

FIG. 11B is a block diagram of a network of computing systems which can include many computing nodes in a public and/or private distributed network, such as a peer to peer network, connected in a wired and/or wireless manner using wireless protocols and Internet Protocol (IP) in accordance with an embodiment of the present disclosure. In the example of FIG. 11B, multiple nodes, 1100-1, 1100-2, 1100-3, . . . , 1100-N, are shown connected in a network such as a peer to peer network. The network can support a distributed ledger technology (DLT) such as "block chain" technology. A distributed ledger is a database that is spread over several nodes or computing devices.

A "block chain" is a continuously growing, encrypted list of records. Block chain is one form of a DLT in which multiple nodes, 1100-1, 1100-2, 1100-3, . . . , 1100-N, can share and store the distributed list of records in a peer to peer network manner. As described herein a "block" in block chain is collection of information, e.g., data, headers, transactions, encryption, etc. A block may be added to the growing list of records in the ledger if it is validated. Blocks are added to the block chain ledger in chronological order.

Hence, in the example of FIG. 11B, a given node, 1100-1 (H1), 1100-2 (H2), 1100-3 (H3), . . . , 1100-N, may maintain a copy of a current list or records in ledger. The multiple nodes, 1100-1, 1100-2, 1100-3, . . . , 1100-N, may each represent a different host, e.g., computing device with processing resources. For ease of illustration, the hosts or multiple nodes, 1100-1, 1100-2, 1100-3, . . . , 1100-N, may be considered in relation to a block chain for autonomous and/or non-autonomous transportation vehicles, cars, buses, emergency vehicles, etc. Embodiments, however, are not limited to this example.

In this example, a public or private entity's (e.g., a military entity, an airport manager, a hotel owner, a hospital entity, etc.) servers may represent one node, e.g., 1100-1, on the network of nodes, 1100-1, 1100-2, 1100-3, . . . , 1100-N, shown in FIG. 11B. A certified repair facility such as a dealership repair shop may represent another node, e.g., 1100-2. Node 1100-3 may be another host, e.g., another computing device, connected to the peer to peer network via the Internet and/or other wireless connections.

The public or private entity associated with node 1100-1 may maintain a "first block chain ledger" having chronologically linked blocks of data related to a particular subject matter associated with node 1100-1, e.g., maintain a first block chain ledger for all the vehicles associated with that public or private entity. For ease of illustration, and not by way of limitation, the referenced "first block chain ledger", having chronologically linked blocks of data related to a particular subject matter associate with a particular node, e.g., for all the vehicles associated with a given public or private entity, may also be referred to herein as a "global block chain ledger" (or, "global ledger block chain"). The public or private entity can distribute the first block chain ledger ("global ledger block chain") to other nodes, 1100-2, 1100-3, etc., in the peer to peer network and to its vehicles, connected as nodes to the network, in a wired and/or wireless manner. Various wireless communication technologies can be utilized in communicating with different nodes, 1100-1, 1100-2, 1100-3, . . . , 1100-N. For example, different generations of broadband mobile telecommunication technologies (e.g., first through fifth generation (1-5G)), device-to-device (e.g., vehicle to vehicle (v2v)), to communication including Bluetooth, Zigbee, and/or LTE device-to-device communication technologies, and/or other wireless communication utilizing an intermediary devices (e.g., WiFi utilizing an access point (AP)) may be utilized in communicating with different nodes.

In the example of FIG. 11B, node 1100-4 may represent a particular vehicle belonging to a subset or class of vehicles associated with a public or private entity by the particular public or private entity represented by node 1100-1. In this example, node 1100-5 may represent another particular vehicle, in the same or different subset or class of vehicles associated with the public or private entity or, alternatively, not be related to the public or private entity associated with node 1100-1. Similarly, node 1100-N may represent another particular vehicle, in the same or different subset or class of vehicles associated with the public or private entity or, alternatively, not be related to the public or private entity associated with node 1100-1.

Each node may have its own processing resource, e.g., host connected to one or more memory devices such as illustrated in FIG. 11A. Thus, vehicle nodes 1100-4, 1100-5, and 1100-N may each include a single and/or multiple host, e.g., processing resources, 1102-4, 1102-5, 1102-N, respectively. Each host on a given vehicle node, 1100-4, 1100-5, and 1100-N, may connect to multiple memory devices on each vehicle. For example, memory devices 1106-4-1, 1106-4-2, 1106-4-X may be associated with host 1102-4 on node 1100-4, memory devices 1106-5-1, 1106-5-2, and 1106-5-B may be associated with host 1102-5 on node 1100-5, and memory devices 1106-N–1, 1106-N–2, and 1106-N–Z may be associated with host 1102-N on node 1100-N.

In this example, node 1100-1 may regularly send, e.g, distribute, to nodes 1100-4, 1100-5, . . . , and 1100-N an updated copy of the continuously growing first, e.g. "global", block chain ledger (also referred to herein as "global ledger block chain") maintained by node 1100-1 containing chronological blocks, e.g., data, related to the subject matter of all the vehicles associated with the public or private entity. According to block chain technology, node 1100-1 may share a copy of the first, e.g., "global", ledger block chain with other nodes, 1100-1, 1100-2, 1100-3, . . . , 1100-N in the distributed network. However, not all of the "blocks" in the growing first, e.g., "global" ledger block chain maintained by node 1100-1 and received to other particular nodes, 1100-4, 1100-5, . . . , 1100-N, may be authentic and/or relevant to other particular nodes. For example, particular vehicles, e.g., nodes 1100-4, 1100-5, . . . , 1100-N, may belong to a subset or sub-class of vehicles associated with the public or private entity associated with node 1100-1, but only particular blocks in the first, e.g., "global", ledger block chain may relate to a particular node 1100-4, 1100-5, . . . , 1100-N, e.g., particular vehicle, in that subset or sub-class of vehicles. As such, according to embodiments disclosed herein, a particular node, 1100-4, 1100-5, . . . , 1100-N, may validate only those blocks authenticated and relevant to that node, 1100-4, 1100-5, . . . , 1100-N.

According to example embodiments, a particular node, e.g., 1100-4, may validate and add blocks, authenticated and relevant to the node, to a second block chain ledger which may be a subset of fewer that all of the blocks contained in the global ledger block chain received from node 1100-1 to node 1100-4. Node 1100-4 may store the subset of the "global ledger block chain" as a "local block chain ledger" (also referred to herein as "local ledger block chain") on the respective node, 1100-4, 1100-5, . . . , 1100-N. Node 1100-4 may also share the local ledger block chain with other nodes. However, same is not required and the local ledger block chain is termed "local" in that it may remain "local" only to that particular node 1100-4, e.g., the host and/or memory devices of a particular vehicle. Thus, for ease of illustration, the second block chain ledger ("local ledger block chain") may be referred to herein as a local ledger block chain. The node, e.g., 1100-4, may receive many global blocks associated with other global ledger block chains, pertaining to various subject matter, via the network of nodes to which it is connected. However, the node, e.g., 1100-4, may be selective as to which blocks it accepts and allows to be added to its local ledger block chain. As explained in greater detail in connection with FIGS. 12 and 13, embodiments of the present disclosure may use the encryption techniques described in FIGS. 5-9 to validate and add blocks relevant to a particular node, 1100-4, 1100-5, . . . , 1100-N, and store and maintain those blocks on the particular node, 1100-4, 1100-5, . . . , 1100-N, as a "local ledger block chain" data, e.g., as secure firmware updates to a particular vehicle. In one example, a single host (such as shown in FIG. 11A) or multiple host on a particular vehicle, e.g., nodes 1100-4, 1100-5, . . . , 1100-N, can maintain a local ledger block chain. As an example, a single or multiple host can maintain a distributed ledger on the node according to techniques described in co-pending, co-filed U.S. application Ser. No. 16/362,792, entitled "USING MEMORY AS A BLOCK IN A BLOCK CHAIN". In this example, a firmware update relevant to a particular vehicle, e.g, node 1100-4, 1100-5, . . . , 1100-N, may be validated and added to the "local ledger block chain" of the node, 1100-4, 1100-5, . . . , 1100-N, or alternatively discarded.

FIG. 12 illustrates an example of an exchange between a global ledger block chain 1222 and local ledger block chains 1224, 1226, and 1228 as can be operated upon by circuitry and stored in a memory and/or secure array, e.g., by circuitry 1110 and memory 1140 in FIG. 11A. In this example secure updates to data may be validated and stored in memory such as memory array 1101 described in connection with FIG. 11A. As used herein, block" according to block chain technology in a block chain ledger or system can include data (e.g., payload), headers, encryption, history, timestamps, etc. Again, a "block" in a block chain does not have to correlate to or equate to the size of a block of memory, as explained as a storage unit of memory in FIG. 10.

Further, as used herein, the term "global block" is a block in the first block ledger which in the example is maintained and shared across a larger system or network of entities. A "local block" is a block only in a local ledger block chain, maintained as a subset of data relevant to a particular node, e.g., 1100-4, as a subset of particular subject matter relevant to a subset of vehicles or more specific class of entities within a system or network of entities, e.g., memory device 1101 in FIG. 11A. Neither a global block or a local block chain have to equate to a block size of a particular memory architecture. A global block and/or local block may be smaller, equivalent, and/or larger than a block size denomination associated with a particular memory architecture or design.

As shown in FIG. 12, a first, e.g., global ledger block chain 1222 can be related to subject matter associated with node 1100-1 in FIG. 11B. The global ledger block chain can include global blocks 1220-1, 1220-2, 1220-3, 1220-4, 1220-5, 1220-6, and 1220-N. When operated upon by circuitry and logic described herein, the global blocks 1220 can be validated and accepted into second, e.g., local, ledger block chains 1224, 1226, and 1228, shown as local blocks 1221-1, 1221-2, 1221-3, 1221-4, 1221-5, 1221-6, and 1221-N. Second, e.g., local, ledger block chains 1224, 1226, and 1228 may be maintained by nodes 1100-4, 1100-5, . . . , 1100-N shown in FIG. 11B, respectively therein. Alternatively, if not validated to a local ledger block chain maintained on a particular node, e.g., nodes 1100-4, 1100-5, . . . , 1100-N shown in FIG. 11B, the respective global blocks of the global ledger block chain can be rejected therefrom.

For example, when global block chain data is received by a particular memory to be validated and stored as a local block within local ledger block chain, global block chain data has to be validated by circuitry and logic, e.g., circuitry 1110 in FIG. 11A, before it becomes a local block within local ledger block chain. In the example of FIG. 12, global block 1220-1 has been validated, e.g., by circuitry 1110, to become local block 1221-1 in local ledger block chain 1224, global block 1220-2 has been validated to become local block 1221-2 in local ledger block chain 1226, global block 1220-3 has been validated to become local block 1221-3 in local ledger block chain 1228, global block 1220-4 has been validated to become local block 1221-4 in local ledger block chain 1224, global block 1220-5 has been validated to become local block 1221-5 in local ledger block chain 1224, global block 1220-6 has been validated to become local block 1221-6 in local ledger block chain 1226, and global block 1220-N has been validated to become local block 1221-N in local ledger block chain 1228.

In one example embodiment, the global blocks 1220 can be received to a memory device, e.g., 1101 in FIG. 11A, validated, and added (e.g., generated) to a local ledger block chain 1224, 1226, or 1228, by using the circuitry 1110 described in FIG. 11A. In the example of FIG. 12, global block 1220-4 has been received and validated to become local block 1221-4. Local block 1221-4 can be added to the local ledger block chain 1224 after local block 1221-1 has been validated by the circuitry and logic described herein. As described further in connection with FIG. 13, local block 1221-1 is used to validate global block 1220-4 as an update of data stored in the memory. In this example, local block 1221-4 can be accepted and stored as the next block in the local ledger block chain 1224 after local block 1221-1). The global ledger block chain 1222 can include blocks in a block chain configuration, architecture, and/or protocol from multiple hosts (e.g., the host 1102 described in connection with FIG. 11A).

A host and/or memory may maintain, e.g., store, local ledger block chains 1224, 1226, 1228 and include only the validated global blocks that are relevant to a particular host and/or memory. As an example, a local ledger block chain associated with a particular entry node may only store data that relates to traffic in and out of that entry point as blocks in that particular local ledger block chain. Global blocks 1220 may include identifiers for a particular host and/or memory associated with the data included in the global block. For example, local ledger block chain 1224 is shown associated with a particular host/memory identifier (ID_1). Thus, circuitry associated with this host/memory relationship will validate only related global blocks such that local ledger block chain 1224 will include only local blocks 1221-1 (global block 1220-1 from global ledger block chain 1220), local block 1221-4 (global block 1220-4 from global ledger block chain 1220), and local block 1221-5 (global block 1220-5 from global ledger block chain 1220). As an example, local ledger block chain 1224 may be associated with a first entry node (e.g., entry node 333-1). Local ledger block chain 1226 is shown associated with another host and/or memory identifier (ID_2). As an example, local ledger block chain 1226 may be associated with a second entry node (e.g., entry node 333-2). Thus, circuitry associated with this host/memory relationship will validate only related global blocks such that local ledger block chain 1226 will include local block 1221-2 (global block 1220-2 from global ledger block chain 1220), and local block 1221-6 (global block 1220-6 from global ledger block chain 1220). Local ledger block chain 1228 is shown associated with another host and/or memory identifier (ID_k) (e.g., a third entry node such as entry node 333-3 in FIG. 3). Thus, circuitry associated with this host/memory relationship will validate only related global blocks (related to all entry points into a location) such that local ledger block chain 1228 will include the local block 1221-3 (global block 1220-3 from global ledger block chain 1220), and local block 1221-N (global block 1220-N from global ledger block chain) as these blocks pertain to that particular entry node or access point.

Using a local ledger block chains (e.g., 1224, 1226, 1228) to store appropriate block chain data as updates to the memory of a respective host and/or memory relationship (e.g., ID_1, ID_2, and ID_k) can provide secure updates to data stored in a given memory device (e.g., the memory device 1106 of FIG. 11A) in association with a given host. As such, the circuitry and logic described herein allow for the exchange and organization shown in FIG. 12. For example, circuitry is configured to receive a global block e.g., 1220-4 from a global ledger block chain 1222 and determine whether the global block 1220-4 is related to a particular the host and/or memory relationship. If the global block 1220-4 is related to the particular host and/or memory, e.g., a comparison of encrypted hash for respective identifiers (e.g., ID_1, ID_2, and ID_k) according to block chain techniques match, the circuitry may add the global block 1220-4 to its local ledger block chain 1224. Global block 1220-4 of block chain data can include a payload of an update to data included in a secure array associated with the host and/or memory. The circuitry described herein, e.g., circuitry 1110, may validate the global block 1220-4 by checking, e.g., comparing, a cryptographic hash of a current local block e.g., 1221-1 in the local ledger block chain 1224 and a cryptographic hash of the data stored in the memory to be updated, contained in global block 1220-4. The current local block 1221-1 of the local ledger block chain 1224 also has a digital signature associated therewith which is similarly compared to indicate whether the global block 1220-4 is from an authorized entity (e.g., includes an identifier ID_1 evidencing that global block 1220-4 is from an entity associated with the particular host and/or memory relationship including the local ledger block chain 1224). As explained in connection with FIG. 13, if validated the current local block 1221-1 will become the "previous" local block and global block 1220-4 will become the then "current" local block 1221-4 in the local ledger block chain 1224. The contents of the local blocks 1221 of the local ledger block chain 1224 (e.g., and/or 1226, 1228) are described in detail in connection with FIG. 13.

An authorized entity may provide the global ledger block chain 1222 as a public ledger which may be distributed to all and/or a portion of the hosts and/or memory that concur the global ledger block chain 1222 to receive access to a particular location. For example, the global ledger block chain 1222 may be generated and maintained by an entity which may monitor traffic into and out of a particular location, roadway, etc. For example, the global ledger block chain 1222 may be generated and monitored by a public or private entity (e.g., a military entity, an airport manager, a hotel owner, a hospital entity, etc.) that then monitors particular vehicles as they move in and out of a location. Each of the global blocks 1220 within the global ledger block chain 1222 may include entrance and exit data for a vehicle with a particular identifier. For instance, as illustrated by FIG. 12, the global blocks 1220-1, 1220-4, 1220-5 correspond to host and/or memory ID_1, global blocks 1220-2, 1220-6, correspond to host and/or memory ID_2, and global blocks 1220-3, 1220-N correspond to host and/or memory ID_k. Where the different ID's correspond to a different host and/or memory relationship (e.g., different vehicles).

In this instance, the public or private entity generates and monitors the global ledger block chain 1222 such that each instance of an update of entrance of exit generated for particular vehicles (e.g., or a particular subset of vehicles sharing the identifier) is recorded as an immutable record in the global ledger block chain 1222. For example, global block 1220-1 includes an update for a vehicle (e.g., or data in the memory associated with the vehicle) associate with ID_1, global block 1220-2 includes an update for vehicles associated with ID_2 and so on. The global blocks 1220 are assembled in sequential order as they are produced by the public or private entity and each global block 1220 can include a digital signature indicating the particular gate and/or particular location where the vehicle is entering or exiting. In this way, the public or private entity may keep an immutable record of all of the updates (e.g., enters and exits, movements, etc.) generated for the different vehicles monitored.

As used in block chain technology, and described more in connection with FIG. 13, the global blocks 1220 in the global ledger block chain 1222 can include multiple headers and encryption. For example, the global block of a global ledger block chain can include a global block header including a cryptographic hash data (e.g., a link to) to the previous global block and a hash including a cryptographic hash data to a previous local block. Thus, when the global block is received by the host 1102 and/or memory device 1106 in FIG. 11A, the global block to be added to the local ledger block chain can include a cryptographic hash (e.g., a link to) a current local block (e.g., in block chain data 1120) in the local ledger block chain and a cryptographic hash of the update to data stored in the memory device 1106 (e.g., a payload). The block chain data 1120 in a local ledger block chain can also include a digital signature associated therewith that indicates that the global block is from an authorized entity.

Stated differently, a global block from a global ledger block chain may be received by the host and/or the memory, e.g., host 1102 and/or memory 1140 shown in FIG. 11A, and the circuitry and/or logic on the host and/or the memory may determine if the global block is related to the host and/or the memory. If so, the global block and its contents may be validated to become a new local block of block chain data stored in a local ledger block chain (e.g., as part of block chain data 1120 stored on the array 1101 of the memory 1140 in FIG. 11A). The local block can also include a header having a timestamp indicating when the local block was generated/received.

The cryptographic hash of the data stored in a memory array, e.g., memory array 1101 of FIG. 11A) to be updated, altered, configured, an/or otherwise changed by the data included in the received/generated local blocks, and/or the cryptographic hash of the previous local block in the local ledger block chain, can comprise, for instance, a SHA-256 cryptographic hash. Further, the cryptographic hash of the data stored in memory array, and the cryptographic hash of the previous local block in the local ledger block chain, can each respectively comprise 256 bytes of data.

The cryptographic hash of the data stored in memory array can be generated (e.g., calculated), by circuitry, e.g., circuitry 1110 in FIG. 11A. In such an example, the cryptographic hash of the data stored can be internally generated by memory device, e.g., memory device 1106 in FIG. 11A, without having external data moving on a host/memory device interface, e.g., interface 1104 in FIG. 11A. As an additional example, the cryptographic hash of the data can be communicated from an external entity. For instance, a host can generate the cryptographic hash of the data stored in a memory array and send the generated cryptographic hash to a memory device e.g., circuitry of the memory device can receive the cryptographic hash of the data stored in memory array from host.

Further, a digital signature associated with a local block can be generated (e.g., calculated), by circuitry based on (e.g., responsive to) an external command, such as a command received from a host. The digital signature can be generated using symmetric or asymmetric cryptography. The digital signature may include a freshness field in the form of the previous local block on the global ledger block chain (which should match the current local block on the local ledger block chain when the block is added). As an additional example, a host can generate the digital signature, and send (e.g. provide) the generated digital signature to a memory device.

The freshness field, described herein, may change with each global block that is added to the local ledger block chain. Accordingly, the freshness field may be used to validate the incoming global block is the correct block to be added as the next block in the local ledger block chain. The incoming global block is verified to be the next local block to be added to the local ledger when the digital signature indicates that the incoming global block is related to the host, and the previous local block field (the freshness) of the incoming global block is the same as the current local block in the local ledger block chain. Because the freshness can also be used to calculate the digital signature, the digital signature can be different with each incoming global block.

As mentioned, the digital signature can be, for instance, a digital signature generated using asymmetric cryptography (e.g., based on a public and/or private key), and can comprise, for instance, an elliptical curve digital signature. As an additional example, the signature can be generated using symmetric cryptography (e.g., based on a unique secret key shared between a host and a memory device). The secret key can be exchanged by using any asymmetric protocol (e.g., the Diffie-Hellman protocol). In other examples, the key may be shared with a host in a secure environment (e.g., factory production, secure manufacturing, as a vehicle is associated with a public or private entity, etc.). The generation and validation of the secret key is discussed further in connection with FIGS. 5-9.

As described in connection with FIG. 11A, such block chain data 1120 can be stored in a memory array, e.g., memory array 1101 in FIG. 11A. The block chain data 1120 can be stored in a portion of memory array 1101 that is inaccessible to a user of memory device and/or host (e.g., in a "hidden" region of memory array). Storing a local block and/or local ledger block chain of block chain data in a particular memory array can simplify the storage of the local block by removing the need for software storage management for the local block.

In the example of FIG. 12, global block 1220-6 can include a global header having a field for a hash of a previous global block 1220-5, where the previous global block field indicates the preceding block in the global ledger block chain 1222. A different hash in the global header can include a previous local block field, where the previous local block field indicates the preceding global block with an identifier of same host and/or memory ID.

For example, global block 1220-6 may include a local block field with a hash for global block 1220-2 (the previous related global block) because they are both vehicle ID_2. In this way, a particular host and/or memory device relationship (e.g., for a vehicles, or subset of vehicles) may receive multiple global blocks 1220 from the global ledger block chain 1222, and determine which global blocks 1220 to accept as local blocks and which global blocks 1220 to discard.

For example, the local ledger block chain 1224 may be included in a memory device and/or memory associated with a particular host through an identifier in the form of a host (e.g., a vehicle) with ID_1. The circuitry as described herein can be configured to store global blocks 1220 in the memory associated with the host vehicle as part of the local ledger block chain 1224. In other words, the circuitry is configured to receive multiple global blocks 1220 from the global ledger block chain 1222, and when the circuitry determines that the global block(s) 1220 belong to the host vehicle associated with vehicle ID_1, they are accepted as local blocks 1221 and added to the local ledger block chain 1224.

Specifically, in an example, a host vehicle and/or memory associated with the host vehicle with an ID_1 includes, e.g., may store, the local ledger block chain 1224 and the circuitry and/or memory may receive multiple global blocks 1220-1, 1220-2, 1220-3, 1220-4, 1220-5, 1220-6, and 1220-N from the global ledger block chain 1222. The circuitry is configured to determine whether the multiple global blocks 1220 received from the global ledger block chain 1222, by the circuitry are related to the host vehicle and/or memory associated with the host vehicle ID_1. Thus, the circuitry may determine that the global blocks 1220-1, 1220-4, and 1220-5 are related to the host vehicle ID_1, and the circuitry is configured to validate and, if validated, to sequentially add global blocks 1220-1, 1220-4, 1220-5 of the multiple global blocks received from the global ledger block chain 1222 to the local ledger block chain 1224 as local blocks 1221-1, 1221-4, and 1221-5 because it has been verified that they are related to the host vehicle ID_1. In another example, a determination of whether the multiple global blocks 1220 are related to a particular gate of a location. In this way, different blocks can be sorted and associated with different entities where one local block chain ledger may be associated with a vehicle (including all enters and exits a vehicle makes) and another local block chain ledger may be associated with a gate (including all vehicles that enter and exit that gate), etc.

In one example, the global blocks 1220-1, 1220-4, and 1220-5 can be added (sequentially) to the local ledger block chain 1224 when a previous local block field in each of the respective global blocks 1220 matches a current local block field in the current local block of the local ledger block chain 1224. Specifically, the circuitry can validate the incoming global block 1220-4 by confirming that the global block 1220-4 is from an authorized entity (e.g., the vehicle identity in the global ledger block chain 1222) and checking that the previous local block field of global block 1220-4 is a hash for local block 1221-1 (which is the same as the global block 1220-1), and checking that the current local block 1221-1 has a matching hash in its own current local block field. This procedure can be applied to add the global block 1220-5 to the local ledger block chain 1224. Thus, the global blocks 1220-1, 1220-4, and 1220-5 can become local blocks 1221-1, 1221-4, and 1221-5 in the local ledger block chain 1224. Using this method and configuration, the local ledger block chain 1224 includes multiple local blocks related to a host and/or memory associated with (ID_1) assembled in sequential order.

Additionally, the circuitry is configured to refrain from adding global blocks 1220 to the local ledger block chain 1224, when they are unrelated to the host and/or memory ID_1. Thus, the circuitry may determine that global blocks 1220-2, 1220-6, 1220-3, and 1220-N are not related to the host and/or memory ID_1 and may discard the unrelated global blocks from local ledger block chain 1224. The mechanisms described in connection with FIG. 12 may be applied to multiple hosts and/or multiple memories e.g., local ledger block chain 1226, and local ledger block chain 1228.

For example, the circuitry may generate a local ledger block chain (e.g., 1224) for validating an update to data stored in the memory (e.g., associated with ID_1) and receive global blocks (e.g., 1220-1, 1220-2, 1220-3, 1220-4, 1220-5, 1220-6, 1220-N) from a global ledger block chain 1222. The circuitry may add a first portion (e.g., 1220-1, 1220-4, 1220-5) of the global blocks to the local ledger block chain 1224 when a digital signature associated with each of the global blocks of the first portion is verified by the circuitry to be related to the host and/or memory (e.g., ID_1). The circuitry may discard a second portion (e.g., 1220-2, 1220-6, 1220-3, 1220-N) of the received global blocks when the second portion of the global blocks are determined to be unrelated to the host and/or memory associated with ID_1, (e.g., the second portion is associated with ID_2, and/or ID_k).

As is described further in connection with FIG. 13, a freshness field may be used by the circuitry to verify a global block belongs in the local ledger block chain (e.g., 1224, 1226, 1228). In the example above, each of the global blocks of the first portion (e.g., 1220-1, 1220-4, 1220-5) include a freshness field used to generate the digital signature. The freshness field for each of the global blocks of the first portion (e.g., 1220-1, 1220-4, 1220-5) corresponds to a current local block of the local ledger block chain 1224. As such, the global blocks of the first portion (e.g., 1220-1, 1220-4, 1220-5) are added to the local ledger block chain 1224 in sequential order (as local blocks 1221-1, 1221-4, and 1221-5) and stored in the memory associated with the host.

Specifically, the circuitry can generate a digital signature based on a freshness field of the global block. For instance, the circuitry may generate the freshness field of global block 1220-4 by identifying a previous local block field in the header of the global block 1220-4 (in this instance, this would be a hash of global block 1220-1 because it is the previous global block with the ID_1). Where the current local block 1221-1 of the local ledger block chain 1224 and the previous local block field (again, in this instance this would be global block 1220-1) of the global block 1220-4 of the global ledger block chain 1222 are the same.

FIG. 13 illustrates an example of a local ledger block chain (e.g., local ledger block chain 1324) for secure updates stored in memory (e.g. in memory array 1101 previously described in connection with FIG. 11A) in accordance with an embodiment of the present disclosure. The local ledger block chain 1324 can be similar to the local ledger block chain 1224 described in connection with FIG. 12. For ease of illustration, FIG. 13 illustrates only local ledger block chain 1324. However, examples described in connection with FIG. 13, and local ledger block chain 1324, may also be applied for other local ledger block chains (e.g., local ledger block chains 1226 and 1228 described in connection with FIG. 3). Local ledger block chain 1324 is a block chain used for secure monitoring of traffic entering and exiting a location and/or roadway using data stored in a memory of a respective host and/or memory exchange. As one example, the host and/or memory exchange is associated with a particular identifier, e.g., identifier ID_1.

In this example, the local blocks 1321-1, 1321-4, 1321-5 of the local ledger block chain 1324 are blocks that were received as, e.g., previously, global blocks 1220-1, 1220-4, 1220-5 in the example of FIG. 3). In one example, circuitry 1110 in FIG. 11A operates on the received global blocks using block chain encryption and decryption techniques described in connection with FIGS. 5-9 to compare and validate respective a hash of the block chain data, e. g., using an SHA256 hash. When the global blocks are verified as being related to the host and/or memory (e.g., ID_1), they may become local blocks 1321-1, 1321-4, and 1321-5 and be stored as an immutable record in the local ledger block chain 1324 for the host and/or memory associated with ID_1. In this example, circuitry operates to compare a block chain hash for local block 1321-4 (e.g., previously global block 1320-4) to local block 1321-1 (e.g., previously global block 1220-1), for storage in the memory associated with the host ID_1. Once validated by the circuitry associated with the host and/or memory, the circuitry may link to the local block 1321-1. Likewise, local block 1321-5 (e.g., previously global block 1220-5) once validated by the circuitry associated with the host and/or memory may link to the local block 1321-4.

In the example of FIG. 13, each local block (e.g., 1321-1, 1321-4, and/or 1321-5 etc.) may respectively include the following information: a global block header, e.g., 1330-1, 1330-4, 1330-5, and a local block header, e.g., 1332-1, 1332-4, 1332-5. In this example, each local block header 1332-1, 1332-4, 1332-5 includes a previous local block hash 1345-1, 1345-4, 1345-5, a current local block hash 1334-1, 1334-4, 1332-5, and a block signature 1335-1, 1335-4, 1335-5. As shown in the example of FIG. 13, each local block, e.g., 1321-1, 1321-4, and 1321-5, includes a payload, e.g., 1336-1, 1336-4, 1336-5 as part of the block's information, e.g., data. As mentioned in connection with FIG. 3, each of the blocks (e.g., global and local) may include multiple headers (e.g., 1330-1, 1332-1) to link a current block to a previous block in their respective block chain ledgers (global or local).

For example, referring to the method of adding local block 1321-4 to the local ledger block chain 1324, the global block header 1330-4 may include a freshness field in the form of a hash for a previous global block having the same associated ID_1 within the global ledger block chain, as well as a hash for the current global block (to link the global ledger block chain together). Put another way, when the global block (e.g., 1220-4 of FIG. 12) is in a global ledger block chain (e.g., 1222 of FIG. 12), the freshness field in the global block header is a hash for a previous global block (e.g., 1220-1 of FIG. 12) having the same associated identifier (e.g., ID_1) in the global ledger block chain (e.g., 1222 of FIG. 12). In this example, when local block 1321-4 is being verified to be added to the local ledger block chain 1324, the current local block hash 1334-1 of the local block 1321-1 in the local ledger block chain 1324 will be the same as the freshness field in the global block header 1330-4 when the circuitry validates the incoming global block (e.g., 1220-4) to add it to the local ledger block chain 1324 as local block 1321-4. Put even another way, the freshness field of the of the global block header 1330-4 should match the current local block hash 1334-1 of the local block 1321-1 of the local ledger block chain 1324 because the current local block 1321-1 was previously global block 1220-1.

The local block headers e.g., 1332-1, 1332-4, and 1332-5 each respectively include a previous local block hash e.g., 1345-1, 1345-4, and 1345-5 (to link together the local ledger block chain 1324), and a current local block hash e.g., 1334-1, 1334-4, and 1334-5 (which is the same as an incoming global block freshness field), and block signatures e.g., 1335-1, 1335-4, 1335-5 to indicate that the block is from an authorized entity (e.g., a listed vehicle identity and/or an entity associated with a host and/or memory) and related to the host and/or memory (e.g., ID_1). The payload e.g., 1336-1, 1336-4, and 1336-5 can be data which includes a hardware, configuration, and/or software update (e.g., configuration, change in configuration, alteration to a device of the host and/or memory associated with the host, etc.) and and/or a cryptographic hash of the data stored in the memory to be updated.

For example, a host, in the form of a vehicle and/or memory associated with the vehicle having an identifier of ID_1, may include a memory and circuitry to generate a local ledger block chain 1324 for validating an update to data stored in the memory. In this example, the local ledger block chain 1324 is comprised of local block 1321-4 (e.g., global block 1220-4 of FIG. 12) taken from a global ledger block chain (e.g., 1222 of FIG. 12). The local block 1321-4 includes a current local block cryptographic hash 1334-4 of the current local block 1321-4. The current local block cryptographic hash 1334-4 may be compared to a previous local block cryptographic hash 1345-4 which was current local block hash 1334-1, as a freshness field to validate an order (e.g., a sequence) and link the local ledger block chain 1324 and a cryptographic hash of data stored in the memory to be updated (e.g., the payload 1336-1, 1336-4, and 1336-5). The local block 1321-4 of the local ledger block chain 1324 has a digital signature 1335-4 associated therewith that indicates the global block (e.g., 1220-4 of FIG. 12) was from an authorized entity and was correctly added as the local block 1321-4. In some examples, the authorized entity may be a public or private entity associated with the vehicles which is monitoring all vehicles associated with the public or private entity. In this way, the host and/or memory associated with ID_1 may check the block signature (e.g., 1335-4) and may discard global blocks received from the global ledger block chain (e.g., the global ledger block chain 1322) that are not related to the host and/or memory associated with ID_1.

The host and/or memory ID_1 can be configured to receive the local ledger block chain 1324 from the memory, validate the update (e.g., the payload 1336-1, 1336-4, and 1336-5) to the data stored in the memory using the received local ledger block chain 1324. In this way, the host and/or memory associated with ID_1 can maintain and/or monitor each of the updates provided to the host and/or memory from the authorized entity. Because the assembly of the local ledger block chain 1324 generates an immutable record, the circuitry may maintain control over what updates have taken place. This may prevent fraudulent updates, unintentional changes, unintentional error, and nefarious hacking attempts. Additionally, the maintenance of a local ledger block chain 1324 on the memory associated with the host can provide a record of updates which may be produced upon demand. After a global block from the global ledger block chain (e.g., the global ledger block chain 1222 of FIG. 12) has been validated and added to the local ledger block chain 1324, the circuitry may implement the update included in the payload e.g., 1336-1, 1336-4, and 1336-5.

For example, the local ledger block chain 1324 may validate a global block (e.g., the global block 1220-1 of FIG. 12) and add it to the local ledger block chain 1324 as the local block 1321-1. After the validation, the circuitry can execute the update 1338-1 included in the payload 1336-1 of the local block 1321-1. The authorized entity may push another update to the host and/or memory associated with ID_1, as such, the circuitry may receive a second global block (e.g., the global block 1220-4 of FIG. 12) which may be validated by the circuitry and added sequentially as local block 1321-4, linked to local block 1321-1. The circuitry may check and compare a cryptographic hash of a freshness field e.g., previous local block hash 1345-4. If valid, this validation and linking in the local ledger block chain 1324, the circuitry may execute the update 1338-2 included in the payload 1336-4 of local block 1321-4. Using this method, the memory may continue to add global blocks as local blocks to the local ledger block chain 1324 as described for local block 1321-5, etc. In some examples, the host and/or memory associated with ID_1 may remove an older portion of the local ledger block chain 1324 to create vacancy in the memory as the local ledger block chain 1324 increases when more updates are generated by the authorized entity.

For example, the host and/or memory may be a computing device of a vehicle having an ID_1, and the local ledger block chain 1324 can indicate updates to a software and/or hardware component on-board the vehicle. The computing device may include a threshold amount of immutable records that can be stored in the memory. In some examples, updates (e.g., 1338-1, 1338-2) are pushed from the authorized entity via global blocks to update a software and/or hardware component of the computing device, the circuitry may remove a local block (e.g., an older local block) from the local ledger block chain 1324 when the local ledger block chain 1324 has reached the threshold. The circuitry may remove an older local block (e.g., 1321-1) to create vacancy in the memory of the computing device for a newer local block (e.g., 1321-5) by executing firmware to alter the root (e.g., the root of the consensus, root of a Merkle tree, etc.) of the local ledger block chain 1324. In this way, the circuitry can maintain control of the updates as the local ledger block chain 1324 adds new local blocks.

In one embodiment, the above described global block chain and local ledger block chains can be used to securely monitor traffic of vehicles. As an example, as a vehicle enter a location, data can be exchanged between the vehicle and an entry node to securely verify identities of the vehicle and the entry node. The entry node can use the global block chain to verify the identity of the vehicle and any access data related to that particular vehicle. In addition, the entry node can verify that a vehicle associated with this particular identity that has been received has not already entered the location (and thus would indicate that this current vehicle requesting access if not authorized, is fraudulent, is a hacker, etc.). However, if the vehicle is granted access through this process, a block can be added to the global block chain that indicates the vehicle has been granted access. Upon exit of the vehicle from the location, a block can be added to the block chain indicating the vehicle has exited. The local ledger block chains can be used to pinpoint particular entry points and what vehicles have entered and exited those entry points without having to monitor the entire global block chain.

Figure 14A:
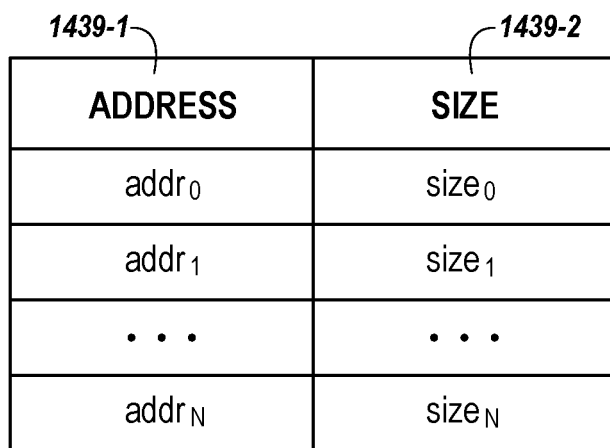
FIG. 14A illustrates an example of a pair of registers used to define a secure memory array in accordance with an embodiment of the present disclosure.
Figure 14B:
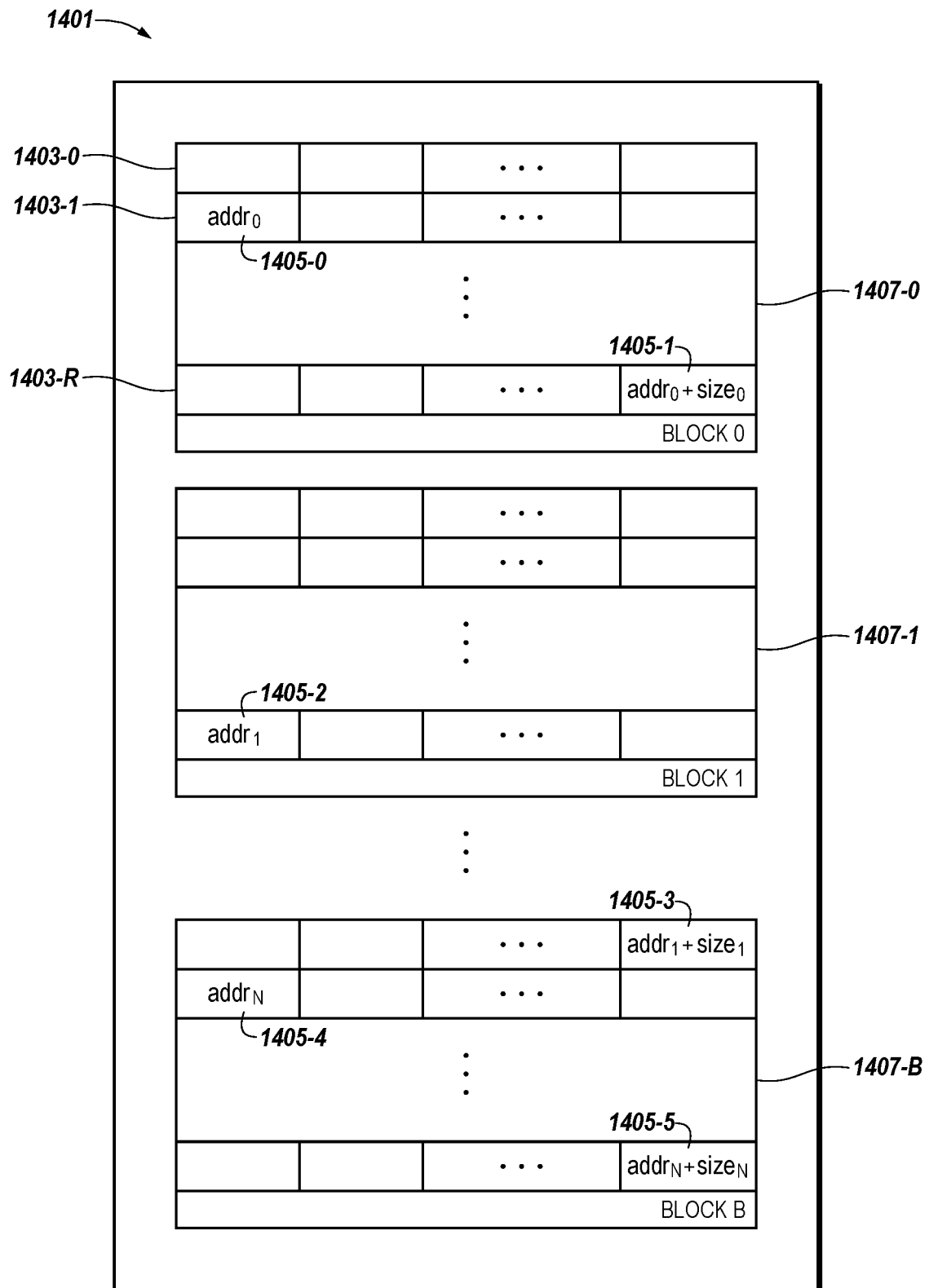
FIG. 14B illustrates a diagram of a portion of a memory array that includes a secure memory array defined in accordance with an embodiment of the present disclosure.

FIG. 14A illustrates an example of a pair of registers 1439-1 and 1439-2 used to define a secure memory array in accordance with an embodiment of the present disclosure, and FIG. 14B illustrates a diagram of a portion of a memory array 1401 that includes a secure memory array defined using registers 1439-1 and 1439-2 in accordance with an embodiment of the present disclosure. Registers 1439-1 and 1439-2 can be, for instance, registers 1139-1 and 1139-2, respectively, previously described in connection with FIG. 11A, and secure memory array 1401 can be, for instance, memory array 1101 previously described in connection with FIG. 11A. For instance, as shown in FIG. 14B, secure memory array 1401 can include a number of physical blocks 1407-0, 1407-1, . . . , 1407-B of memory cells, each including a number of physical rows 1403-0, 1403-1, . . . , 1403-R having a number of sectors of memory cells, in a manner analogous to memory array 1001 previously described in connection with FIG. 10.

As shown in FIG. 14A, register 1439-1 can define addresses of the secure array (e.g., the addresses of different portions of the secure array), and register 1439-2 can define sizes of the secure array (e.g., the sizes of the different portions of the secure array). The addresses of the secure array defined by register 1439-1 can correspond to, for instance, starting points (e.g., starting LBAs) of the secure array (e.g., the starting points of the different portions of the secure array), and the sizes of the secure array defined by register 1439-2 can correspond to, for instance, ending points (e.g., ending LBAs) of the secure array (e.g., the ending points of the different portions of the secure array).

For example, as shown in FIG. 14A, registers 1439-1 and 1439-2 can define N pairs of values, with each respective pair comprising an address value (e.g., addr) defined by register 1439-1 and a size value (e.g., size) defined by register 1439-2. For instance, in the example illustrated in FIG. 14A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_1]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 1439-2 is zero can stop the definition of the secure array. For instance, in the example illustrated in FIG. 14A, if the size value of Pair$_2$ is zero, then the secure array would be given by: $[addr_0, addr_0+size_0] \cup [addr_1, addr_1+size_1]$.

An example of a secure array defined by registers 1439-1 and 1439-2 (e.g., with all size values defined by register 1439-2 as non-zero) is illustrated in FIG. 14B. For instance, as shown in FIG. 14B, the address (e.g., LBA) associated with sector 1405-0 of memory array 1401 is addr$_0$, the address associated with sector 1405-1 of memory array 1401 is addr$_0$+size$_0$, the address associated with sector 1405-2 of memory array 1401 is addr$_1$, the address associated with sector 1405-3 of memory array 1401 is addr$_1$+size$_1$, the address associated with sector 1405-4 of memory array 1401 is addr$_N$, and the address associated with sector 1405-5 of memory array 1401 is addr$_N$+size$_N$. As such, the secure array comprises sectors (e.g., the data stored in sectors) 1405-0 through 1405-1, sectors 1405-2 through 1405-3, and 1405-4 through 1405-5. However, the sectors of memory array 1401 that are before sector 1405-0, and sectors 1405-1 through 1405-2 of memory array 1401, are not part of the secure array (e.g., the secure array comprises a subset of array 1401).

Figure 15:
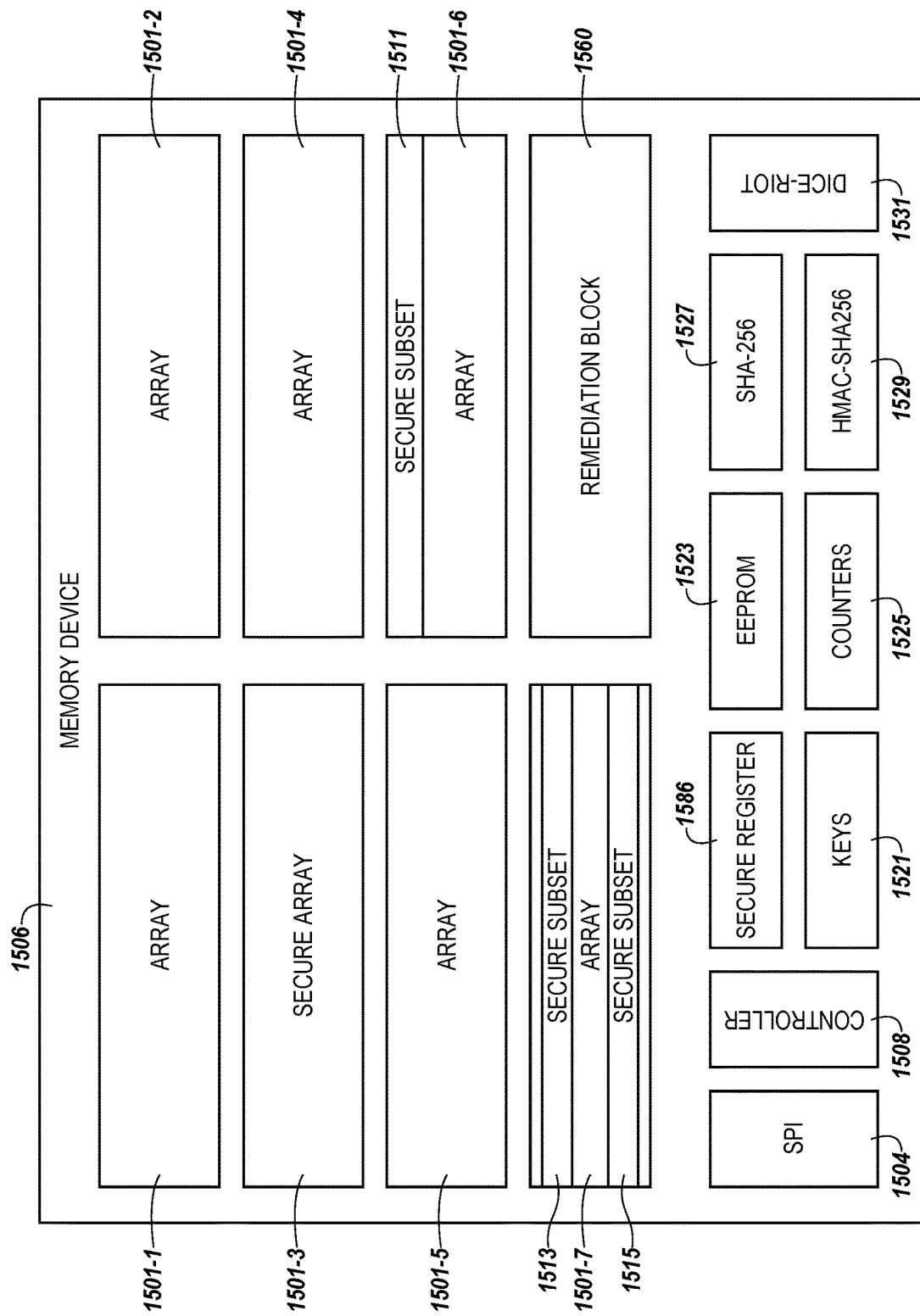
FIG. 15 is a block diagram of an example memory device in accordance with an embodiment of the present disclosure.

FIG. 15 is a block diagram of an example memory device 1506 in accordance with an embodiment of the present disclosure. Memory device 1506 can be, for example, memory device 1106 previously described in connection with FIG. 11A.

As shown in FIG. 15, memory device 1506 can include a number of memory arrays 1501-1 through 1501-7. Memory arrays 1501-1 through 1501-7 can be analogous to memory array 1001 previously described in connection with FIG. 10. Further, in the example illustrated in FIG. 15, memory array 1501-3 is a secure array, subset 1511 of memory array 1501-6 comprises a secure array, and subsets 1513 and 1515 of memory array 1501-7 comprise a secure array. Subsets 1511, 1513, and 1515 can each include, for instance, 4 kilobytes of data. However, embodiments of the present disclosure are not limited to a particular number or arrangement of memory arrays or secure arrays.

As shown in FIG. 15, memory device 1506 can include a remediation (e.g., recovery) block 1560. Remediation block 1560 can be used as a source of data in case of errors (e.g., mismatches) that may occur during operation of memory device 1506. Remediation block 1560 may be outside of the area of memory device 1506 that is addressable by a host.

As shown in FIG. 15, memory device 1506 can include a serial peripheral interface (SPI) 1504 and a controller 1508. Memory device 1506 can use SPI 1504 and controller 1508 to communicate with a host and memory arrays 1501-1 through 1501-7, as previously described herein (e.g., in connection with FIG. 11A).

As shown in FIG. 15, memory device 1506 can include a secure register 1586 for managing the security of memory device 1506. For example, secure register 1586 can configure, and communicate externally, to an application controller. Further, secure register 1586 may be modifiable by an authentication command.

As shown in FIG. 15, memory device 1506 can include keys 1521. For instance, memory device 1506 can include eight different slots to store keys such as root keys, DICE-RIOT keys, and/or other external session keys.

As shown in FIG. 15, memory device 1506 can include an electronically erasable programmable read-only memory (EEPROM) 1523. EEPROM 1523 can provide a secure non-volatile area available for a host, in which individual bytes of data can be erased and programmed.

As shown in FIG. 15, memory device 1506 can include counters (e.g., monotonic counters) 1525. Counters 1525 can be used as an anti-replay mechanism (e.g., freshness generator) for commands (e.g., to sign a command set or sequence) received from and/or sent to a host. For instance, memory device 1506 can include six different monotonic counters, two of which may be used by memory device 1506 for the authenticated commands, and four of which may be used by the host.

As shown in FIG. 15, memory device 1506 can include an SHA-256 cryptographic hash function 1527, and/or an HMAC-SHA256 cryptographic hash function 1529. SHA-256 and/or HMAC-SHA256 cryptographic hash functions 1527 and 1529 can be used by memory device 1506 to generate cryptographic hashes, such as, for instance, the cryptographic hashes of block 220 previously described herein, and/or a golden hash used to validate the data stored in memory arrays 1501-1 through 1501-7 as previously described herein. Further, memory device 1506 can support L0 and L1 of DICE-RIOT 1531.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   circuitry configured to:
      receive identity data, a signature, and a request to enter a location from a vehicular entity; and
      verifying an identity of the vehicular entity by consulting at least one of a plurality of blocks organized in a global block chain to determine whether data associated with the vehicular entity authenticates use of an entryway into the location;

wherein:
each of the plurality of blocks organized in the global block chain are added to local ledger block chains; and
not all blocks within the global block chain are within any of the local ledger block chains.

2. The apparatus of claim 1, wherein the circuitry is configured to verify the vehicular identity of the vehicular entity based on the identity data and the signature.

3. The apparatus of claim 1, wherein each of the plurality of blocks includes a cryptographic hash of a previous block in the global block chain.

4. The apparatus of claim 1, wherein each of the plurality of blocks includes a cryptographic hash of each of the respective plurality of blocks.

5. The apparatus of claim 1, the circuitry further configured to, in response to verifying the identity of the vehicular entity and authenticating use of an entryway into the location, generate a block in the plurality of blocks in the global block chain.

6. The apparatus of claim 5, wherein the generated block indicates that the vehicular entity has been allowed to enter the location.

7. The apparatus of claim 6, wherein the circuitry is further configured to add the generated block in the plurality of blocks in the global block chain to a local ledger block chain associated with the particular entryway into the location that the vehicular entity used.

8. The apparatus of claim 1, wherein each of the local ledger block chains are associated with a particular entryway of a plurality of entryways into the location.

9. An apparatus, comprising:
circuitry configured to:
receive a public key, identity data, a signature, and a request to enter a location from a vehicular entity;
analyze the request by:
verifying an identity of the vehicular entity based on the identity data and the signature; and
determining whether at least one block of a plurality of blocks organized in a global block chain is associated with the vehicular entity; and
wherein:
each of the plurality of blocks organized in the global block chain are added to local ledger block chains; and
not all blocks within the global block chain are within any of the local ledger block chains.

10. The apparatus of claim 9, wherein each of the local ledger block chains are associated with a particular entryway of a plurality of entryways into the location.

11. The apparatus of claim 9, wherein the circuitry is configured to analyze the request by determining whether the at least one block indicates to allow use of an entryway to the location.

12. The apparatus of claim 9, wherein each of the plurality of blocks of the global block chain includes:

a cryptographic hash of a previous block in relation to each of the plurality of blocks in the global block chain; and
a cryptographic hash of each of the respective plurality of blocks.

13. The apparatus of claim 9, wherein the circuitry is further configured to, in response to verifying the identity of the vehicular entity and allowing entry into the location, generate a block in the global block chain that indicates that the vehicular entity has been allowed to enter the location.

14. The apparatus of claim 13, wherein the circuitry is further configured to, in response to verifying the identity of the vehicular entity and allowing entry into the location, add a cryptographic hash of a block added prior to generation of the generated block to the generated block.

15. The apparatus of claim 9, wherein the circuitry is further configured to verify the signature on a freshness field of the at least one block.

16. The apparatus of claim 15, wherein the circuitry determines the freshness field by identifying a field of a previous block of the global block chain.

17. A system, comprising:
a memory; and
circuitry coupled to the memory and configured to:
verify an identity of a vehicular entity based on received identity data and a signature;
consult at least one of a plurality of blocks in a global block chain to determine whether data associated with the vehicular entity authenticates the vehicular entity; and
in response to verifying the identity of the vehicular entity:
allowing the vehicular entity access to a location; and
generating a block in the plurality of blocks in the global block chain indicating that the vehicular entity was allowed access;
wherein:
the plurality of blocks in the global block chain are each added to at least one of a plurality of local ledger block chains;
each of the plurality of local ledger block chains are associated with a particular entryway of a plurality of entryways into the location; and
not all blocks within the global block chain are within any of the local ledger block chains.

18. The system of claim 17, wherein each of the plurality of local ledger block chains are associated with a particular entryway of a plurality of entryways into the location.

19. The system of claim 17, wherein the circuitry, in response to receiving an indication that the vehicular entity has exited, generates an additional block to be added to the plurality of blocks in the global block chain indicating the vehicular entity has exited.

* * * * *